(12) United States Patent
Griffith et al.

(10) Patent No.: US 12,083,999 B2
(45) Date of Patent: Sep. 10, 2024

(54) EXTENDABLE CROSSBAR FOR A VEHICLE

(71) Applicant: Rivian IP Holdings, LLC, Plymouth, MI (US)

(72) Inventors: Eric Griffith, Farmington Hills, MI (US); Christian Elder, Sylvan Lake, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/321,039

(22) Filed: May 14, 2021

(65) Prior Publication Data
US 2021/0268967 A1 Sep. 2, 2021

Related U.S. Application Data

(63) Continuation of application No. 16/680,438, filed on Nov. 11, 2019, now Pat. No. 11,027,661.
(Continued)

(51) Int. Cl.
*B60R 9/04* (2006.01)
*B60R 9/045* (2006.01)
(Continued)

(52) U.S. Cl.
CPC .............. *B60R 9/045* (2013.01); *B60R 9/052* (2013.01); *B60R 9/058* (2013.01)

(58) Field of Classification Search
CPC .......... B60R 9/045; B60R 9/052; B60R 9/058
(Continued)

(56) References Cited

U.S. PATENT DOCUMENTS

| 2,983,414 A | * | 5/1961 | Fehr | .......................... B60R 9/12 224/330 |
| 3,385,488 A | * | 5/1968 | Bronson | ................. B60R 9/058 224/331 |

(Continued)

FOREIGN PATENT DOCUMENTS

| CN | 204547948 U | 8/2015 |
| CN | 107364399 A | 11/2017 |

(Continued)

OTHER PUBLICATIONS

International Search Report and Written Opinion of PCT/US2019/060803 dated Jan. 23, 2020.
(Continued)

*Primary Examiner* — Peter N Helvey
(74) *Attorney, Agent, or Firm* — HALEY GUILIANO LLP

(57) ABSTRACT

A roof rack system for affixing to a vehicle having a plurality of mounting locations system is provided. The roof rack system comprises a crossbar assembly comprising: an axis of motion, e.g., translational motion; an internal structure; a first section; a second section; a third section; a first end mount; and a second end mount. The first and second sections are configured to translate, in opposite directions, along the axis of motion relative to the internal structure. The internal structure is configured to cause the third section to be centered between the first and second sections as the first and second sections translate. The first and second end mounts are coupled to respective outboard portions of the first and second sections. The first and second end mounts are configured to mount to respective first and second mounting locations, e.g., mounting locations of the vehicle.

19 Claims, 18 Drawing Sheets

Related U.S. Application Data

(60) Provisional application No. 62/766,600, filed on Nov. 13, 2018.

(51) Int. Cl.
*B60R 9/052* (2006.01)
*B60R 9/058* (2006.01)

(58) Field of Classification Search
USPC .......................................................... 224/321
See application file for complete search history.

(56) References Cited

U.S. PATENT DOCUMENTS

| | | | | |
|---|---|---|---|---|
| 3,495,750 | A | * | 2/1970 | Milheiro ................. B60R 9/045 224/322 |
| 4,101,061 | A | * | 7/1978 | Sage ....................... B60R 9/058 224/322 |
| 4,354,625 | A | | 10/1982 | Peoples |
| 4,383,628 | A | | 5/1983 | Hiller |
| 4,449,656 | A | | 5/1984 | Wouden |
| 4,489,868 | A | * | 12/1984 | Thirion ................... B60R 9/045 224/326 |
| 4,627,559 | A | | 12/1986 | Andersson |
| 4,757,929 | A | * | 7/1988 | Nelson .................... B60R 9/058 224/322 |
| 5,009,337 | A | * | 4/1991 | Bimbi ....................... B60R 9/00 224/400 |
| 5,397,042 | A | | 3/1995 | Pedrini |
| 6,015,074 | A | | 1/2000 | Snavely et al. |
| 6,079,741 | A | * | 6/2000 | Maver ................. B62D 49/0628 224/404 |
| 6,131,781 | A | | 10/2000 | Murray |
| 10,625,684 | B1 | | 4/2020 | Schafer, Jr. |
| 2002/0066760 | A1 | | 6/2002 | Neaux |
| 2013/0008931 | A1 | * | 1/2013 | Wang ...................... B60R 9/042 224/315 |
| 2016/0167590 | A1 | * | 6/2016 | Sandberg ................ B60R 9/052 224/310 |
| 2018/0022398 | A1 | * | 1/2018 | Schlaupitz ......... B62D 33/0207 224/405 |
| 2020/0062188 | A1 | * | 2/2020 | Boyle ..................... B60R 9/042 |
| 2021/0039560 | A1 | * | 2/2021 | Malgeri ................. B60R 9/048 |

FOREIGN PATENT DOCUMENTS

| | | |
|---|---|---|
| DE | 102015001804 A1 | 8/2016 |
| EP | 1093971 A1 | 4/2001 |
| EP | 2985185 A1 | 2/2016 |
| FR | 1 205 062 | 1/1960 |
| KR | 200402088 Y1 | 11/2005 |
| WO | WO 99/19168 | 4/1999 |
| WO | WO 2013/115701 | 8/2013 |

OTHER PUBLICATIONS

Thule, "Thule Roof Racks Catalog", psgautomotive.com, p. 6, https://psgautomotive.com/wp-content/uploads/Thule-Online-Product-Catalog.pdf, 2014.

Whispbar, "2013 Whispbar Racks Catalog", www.racksforcars.com, pp. 4-10, https://www.racksforcars.com/catalogues/Whispbar%202013%20Product%20Catalogue.pdf, 2013.

\* cited by examiner

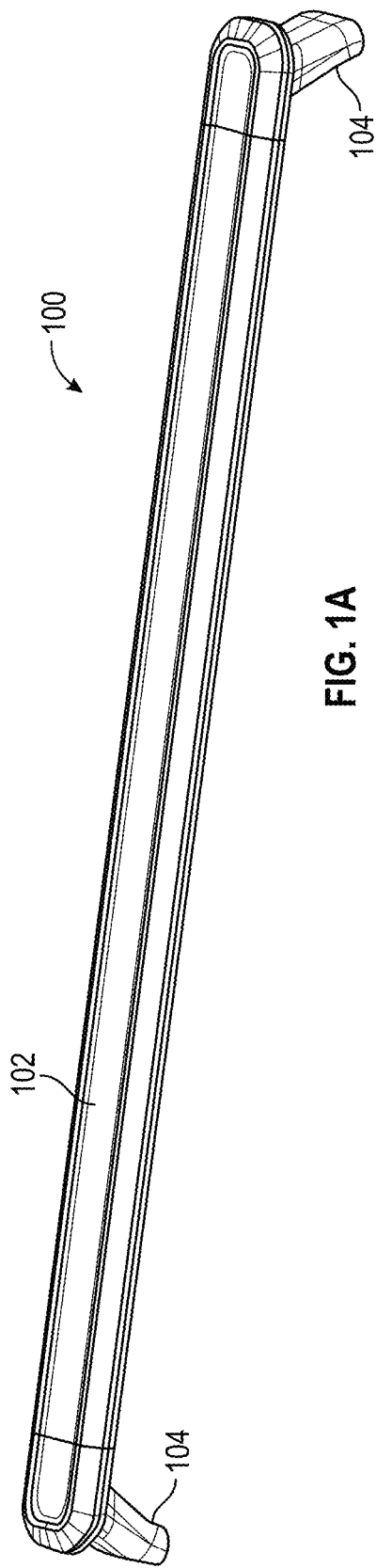
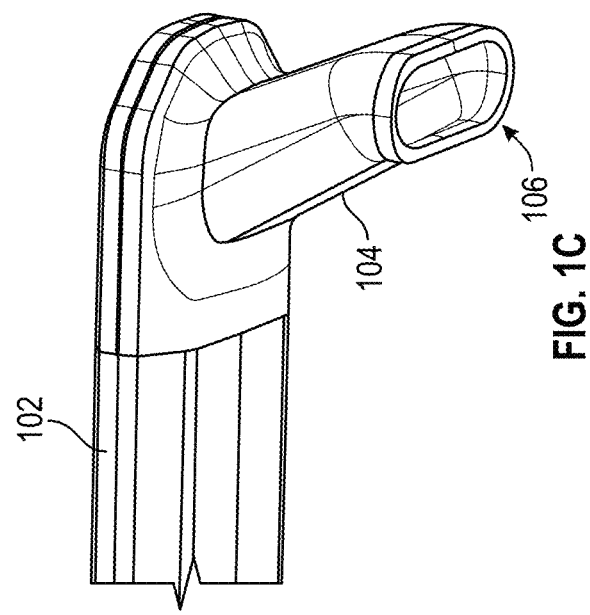
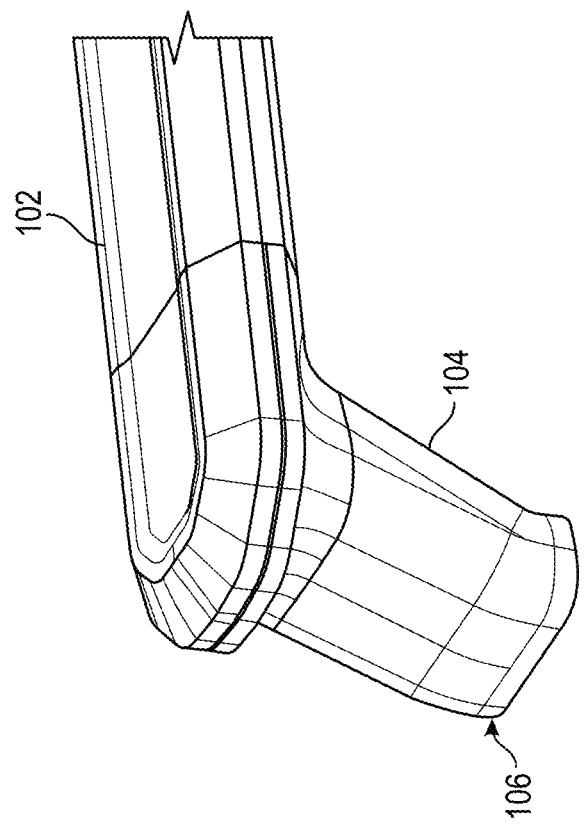
FIG. 1A
FIG. 1B
FIG. 1C

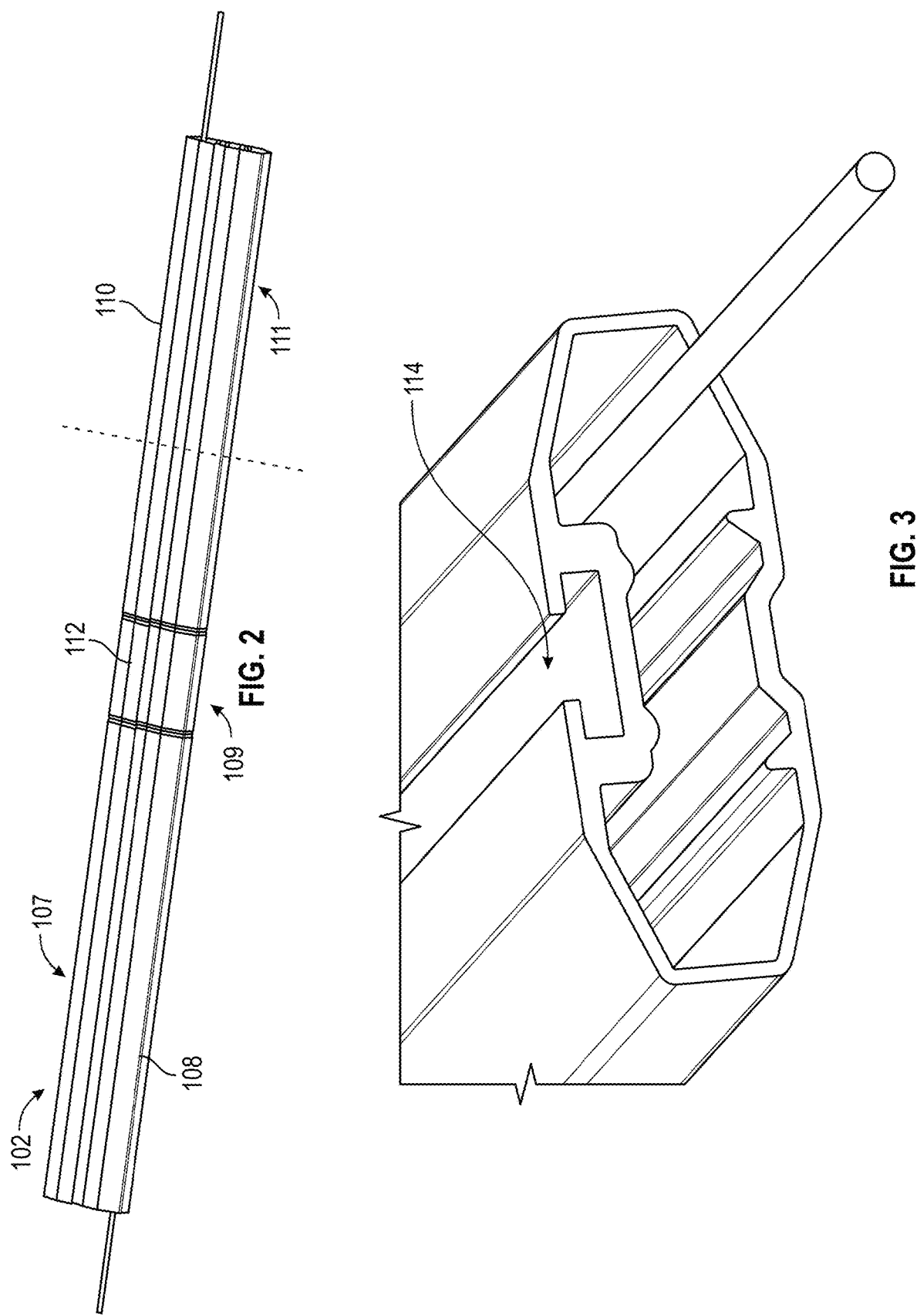

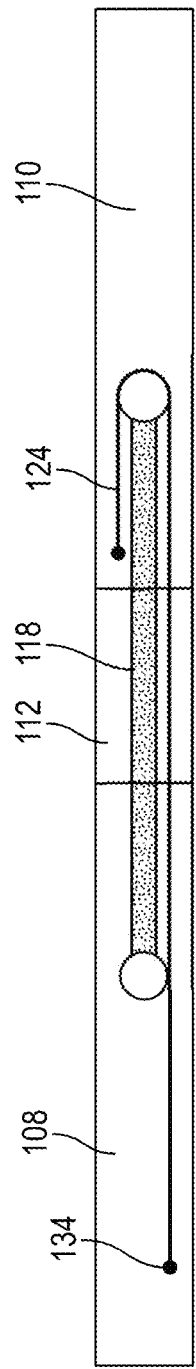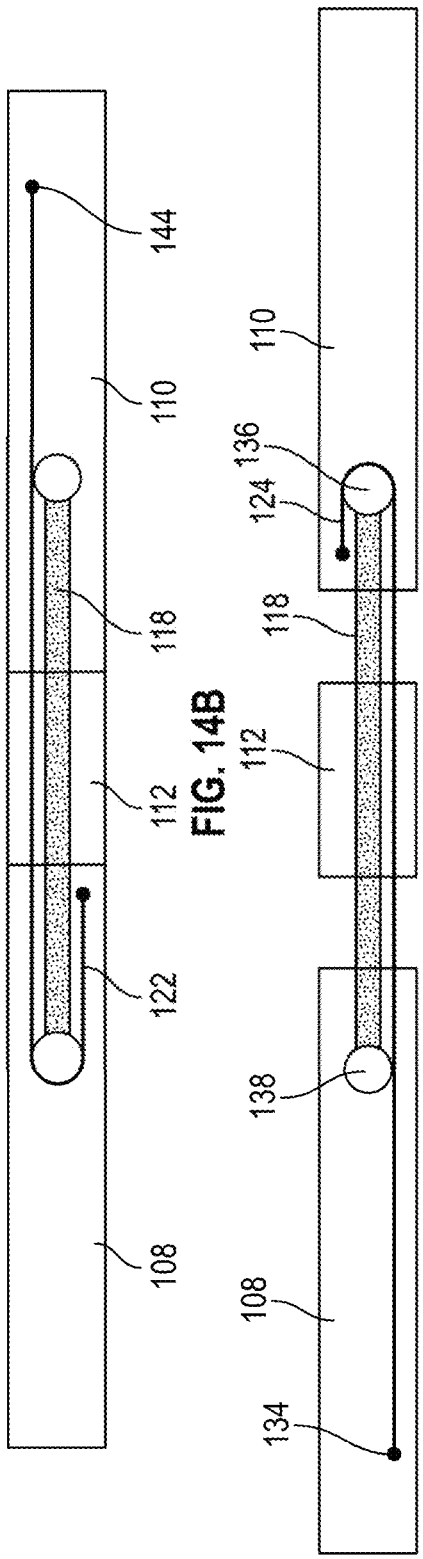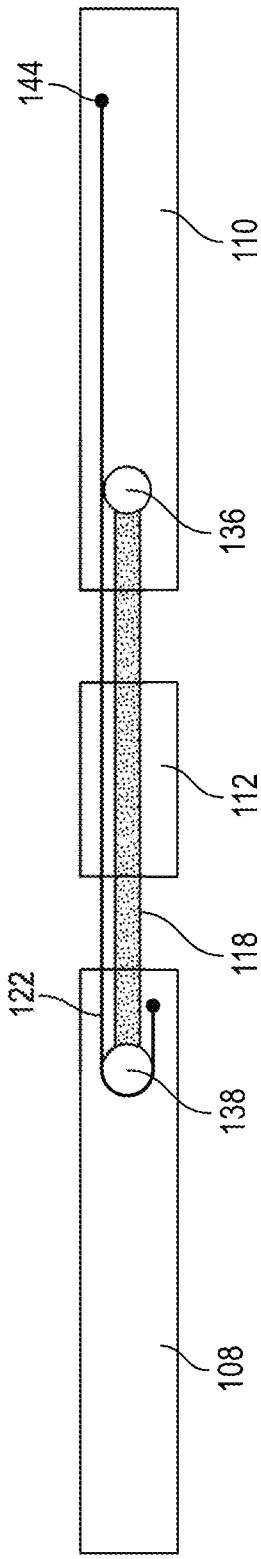

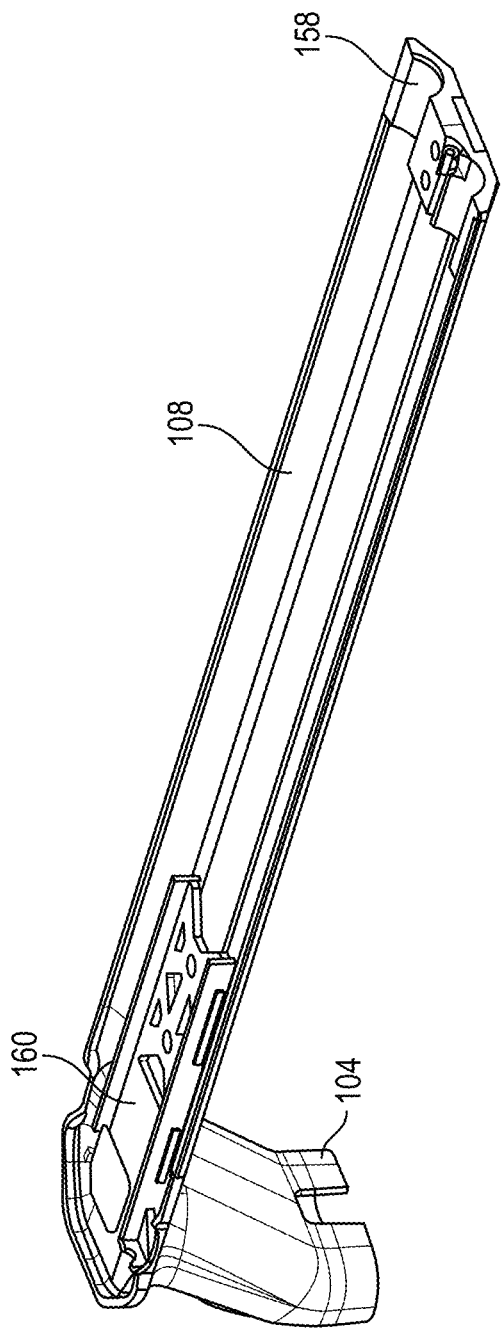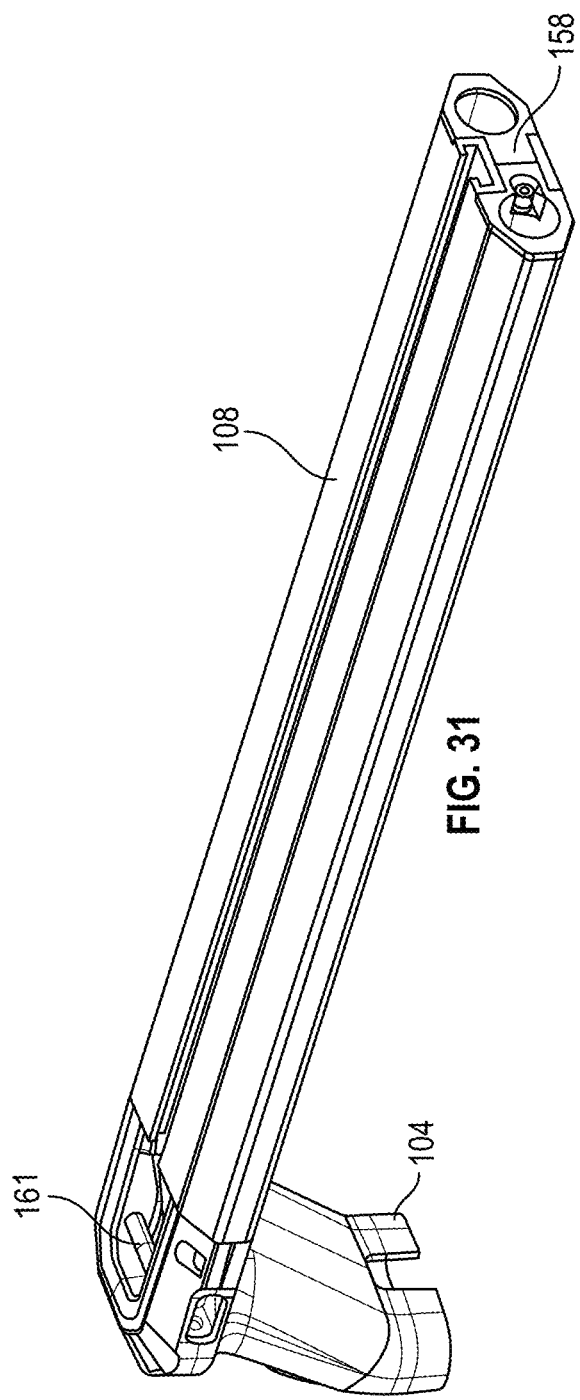

EXTENDABLE CROSSBAR FOR A VEHICLE

CROSS REFERENCE TO RELATED APPLICATION

This application is a continuation of U.S. patent application Ser. No. 16/680,438 filed on Nov. 11, 2019, which claims the benefit of U.S. Provisional Application No. 62/766,600, filed on Nov. 13, 2018, the disclosures of which are hereby incorporated by reference herein in their entireties.

INTRODUCTION

Typically, cargo crossbars are a set length for a particular vehicle application. There may be many different use cases for crossbars on a vehicle, which could require different mounting locations of varying distance therebetween. It would be advantageous for a crossbar to easily accommodate varying distances between mounting locations of a vehicle.

SUMMARY

In some embodiments, a roof rack crossbar assembly is provided. The roof rack crossbar assembly comprises: an axis of motion, e.g., translation; an internal structure; a first section; and a second section. The first section is configured to translate along the axis of motion relative to the internal structure. The first section may be moveably coupled to the internal structure. The second section is configured to translate along the axis of motion relative to the internal structure opposite the first section. The second section may be moveably coupled to the internal structure. The internal structure is configured to cause a transverse plane of the internal structure, e.g., a transverse midplane, to be centered between the first section and the second section as the first section and the second section translate along the axis of motion, e.g., away from the transverse plane of the internal structure. The transverse plane may be a plane perpendicular to the axis of motion.

In some embodiments, the roof rack crossbar assembly comprises a third section rigidly affixable to the internal structure. The third section may be arranged between the first section and the second section such that it is centered between the first section and the second section at the transverse plane of the internal structure.

In some embodiments, the internal structure comprises at least one internal bar configured to provide structure rigidity to the crossbar assembly. In some embodiments, the internal structure comprises at least one moveable coupling, e.g., a slide mechanism, configured to allow the first section and the second section to translate relative to the at least one internal bar. In some embodiments, the at least one internal bar comprises a hollow interior.

In some embodiments, the at least one slide mechanism comprises a pully-cable mechanism. The pulley-cable mechanism may comprise: a pulley rigidly affixed to the at least one internal bar, e.g., towards an outboard end of the at least one internal bar; and a cable comprising a first cable end and a second cable end. In some embodiments, the first cable end is affixed to the first section, e.g., towards an inboard end of the first section. In some embodiments, the second cable end is affixed to the second section, e.g., towards an outboard end of the second section. In some embodiments, the cable is wrapped around the pulley, e.g., such that the pulley engages the cable along the length of the cable between the points at which the cable is affixed to the first section and the second section. In some embodiments, the pulley is rigidly affixed to the at least one internal bar by an axle.

In some embodiments, the first section is positioned on a first side of the transverse plane of the crossbar assembly, e.g., on a first side of the third section. In some embodiments, the pulley-cable mechanism comprises a first pulley rigidly affixed to the at least one internal bar on the first side of the transverse plane of the crossbar assembly. In some embodiments, the pulley-cable mechanism comprises a second pulley rigidly affixed to the at least one internal bar on a second side of the transverse midplane of the crossbar assembly opposite the first side.

In some embodiments, the pulley-cable mechanism comprises a first cable having a first cable end affixed to the first section, e.g., at a point towards an inboard end of the first section, and a second cable end affixed the second section, e.g., at a point towards an outboard end of the second section, wherein the first cable is wrapped around the first pulley.

In some embodiments, the pulley-cable mechanism comprises a second cable having a first cable end affixed to the first section, e.g., at a point towards an outboard end of the first section, and a second cable end affixed the second section, e.g., at a point towards an inboard end of the section, wherein the second cable is wrapped around the second pulley.

In some embodiments, the at least one slide mechanism comprises a rack-and-pinion mechanism. The rack-and-pinion mechanism may comprise a first rack coupled to the first section, a second rack coupled to the second section, and a pinion gear coupled to the internal structure.

In some embodiments, the first section and the second section are configured to move towards and away from the transverse midplane of the crossbar assembly to change a distance between the outboard end of the first section and the outboard end of the second section.

In some embodiments, the first section, the second section, and the third section (where fitted) each comprise a similar outer profile. The outer profile may comprise a T-slot. The outer profile may comprise an aerodynamic feature.

In some embodiments, at least one of the first section, the second section, and the third section are comprised of a metal.

In some embodiments, the internal structure is coupled to the first section and the second section by an intermediate material. The intermediate material may comprise at least one of rubber and plastic.

In some embodiments, the crossbar assembly comprises a first locking mechanism configured to lock the first section to the internal structure. In some embodiments, the crossbar assembly comprises a second locking mechanism configured to lock the second section to the internal structure.

In some embodiments, a roof rack for affixing to a vehicle having a plurality of mounting locations system is provided. The roof rack system may comprise at least one of the crossbar assemblies.

In some embodiments, the roof rack comprises a first end mount, e.g., first stanchion, coupled to an outboard portion of the first section. The first end mount may be configured to mount to a first mounting location, e.g., a mounting location of the vehicle, and support the crossbar, e.g., when the first end mount is coupled to the first mounting location. In some embodiments, the roof rack system comprises a second end mount, e.g., second stanchion, coupled to an outboard portion of the second section. The second end mount may be configured to mount to a second mounting location, e.g., a mounting location of the vehicle, and support the crossbar, e.g., when the second end mount is coupled to the second mounting location.

In some embodiments, a roof rack system for affixing to a vehicle having a plurality of mounting locations system is provided. The roof rack system comprises a crossbar assembly comprising: an axis of motion, e.g., translational motion; an internal structure; a first section; a second section; a third section; a first end mount; and a second end mount. The first section is configured to translate along the axis of motion relative to the internal structure. The second section is configured to translate along the axis of motion relative to the internal structure opposite the first section. The third section is rigidly affixed to the internal structure and arranged between the first section and the second section. The internal structure is configured to cause the third section to be centered between the first section and the second section as the first section and the second section translate. The first end mount is coupled to an outboard portion of the first section. The first end mount is configured to mount to a first mounting location, e.g., a mounting location of the vehicle. The second end mount is coupled to an outboard portion of the second section. The second end mount is configured to mount to a second mounting location, e.g., a mounting location of the vehicle.

In some embodiments, a method for installing a roof rack system on a vehicle is provided. The roof rack comprises: an extendable crossbar assembly; a first end mount coupled to a first end of the crossbar assembly; and a second end mount coupled to a second end of the crossbar assembly, wherein the second end is opposite the first end. The method comprises affixing the first end mount to a first mounting location of the vehicle. The method comprises changing the length of the extendable crossbar by applying a force, e.g., in a longitudinal direction of the crossbar assembly. The method comprises affixing the second end mount to a second mounting location of the vehicle.

In some embodiments, the extendable crossbar assembly comprises a first section, e.g., a right-hand section, and a second section, e.g., left-hand section. In some embodiments, the crossbar assembly additionally comprises a third section, e.g., a center section. The crossbar extends along an axis of motion and the center section is centered, e.g., longitudinally, along the axis. In some embodiments, when the length of the extendable crossbar assembly is changed, the center section remains centered, e.g., about a transverse plane of the crossbar assembly. In some embodiments, changing the length of the extendable crossbar assembly comprises applying a force, e.g., in a longitudinal direction of the crossbar assembly, to at least one of the first section, the third section and the second section. The center section may be a removable portion of the crossbar assembly. The center section may comprise a mounting feature configured to affix an item of cargo to the crossbar assembly. The center section may be an integral portion of the crossbar assembly.

In some embodiments, a roof rack crossbar assembly is provided. The roof rack crossbar assembly comprises: an axis of motion, e.g., translation; an internal structure; a first section; and a second section. At least one of the first section and the second section is configured to translate along the axis of motion relative to the internal structure. In some embodiments, the internal structure may be moveably coupled to at least one of the first section and the second section. In some embodiments, the internal structure may be fixed relative to the first section by virtue of at least one detent feature of the internal structure configured to interact with at least one detent feature of the first section. In some embodiments, the internal structure may be fixed relative to the second section by virtue of at least one detent feature of the internal structure configured to interact with at least one detent feature of the second section. In some embodiments, the first section may comprise a series of detent features, e.g., spaced apart along the axis of motion. In some embodiments, the second section may comprise a series of detent features, e.g., spaced apart along the axis of motion. In some embodiments, the internal structure may comprise a series of detent features, e.g., spaced apart along the axis of motion. In some embodiments, the spacing of the detent features may vary, e.g., in the direction of the axis of motion. The spacing of the detent features of the internal structure may be closer together or further apart than the spacing of the detent features of at least one of the first section and the second section. The spacing of the detent features of the first section may be closer together or further apart than the spacing of the detent features of the second section. In some embodiments, the detent feature of at least one of the first section, the second section and the internal structure may comprise an opening configured to receive a locking pin. In some embodiments, the internal structure may be rigidly connected to one of the first section and the second section and be slidably connected to the other of the first section and the second section.

It will be understood that the term roof rack or roof rack system, as used herein, is used to describe any type of cargo rack or cargo rack system, e.g., a vehicle cargo rack or vehicle cargo rack system. The term roof rack or roof rack system is not limited to a vehicle roof, and may be applied to a roof, a cargo bed, a hood, a load space, any other suitable exterior surface of a vehicle, any other suitable interior surface of a vehicle, or any combination thereof.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIGS. 1A to 1C show several views of an exemplary roof rack system, in accordance with some embodiments of the present disclosure.

FIG. 2 shows an illustrative crossbar, in accordance with some embodiments of the present disclosure.

FIG. 3 shows a cross-sectional view of the illustrative crossbar of FIG. 2.

FIGS. 14A and 14B show block diagrams of an illustrative crossbar in a contracted state, in accordance with some embodiments of the present disclosure.

FIGS. 15A and 15B show block diagrams of an illustrative crossbar in an expanded state, in accordance with some embodiments of the present disclosure.

FIG. 30 shows a perspective cross-sectional view of an illustrative left-hand outer piece and corresponding stanchion, in accordance with some embodiments of the present disclosure.

FIG. 31 shows a perspective view of an illustrative left-hand outer piece and corresponding stanchion, in accordance with some embodiments of the present disclosure.

DESCRIPTION

Figure 4:
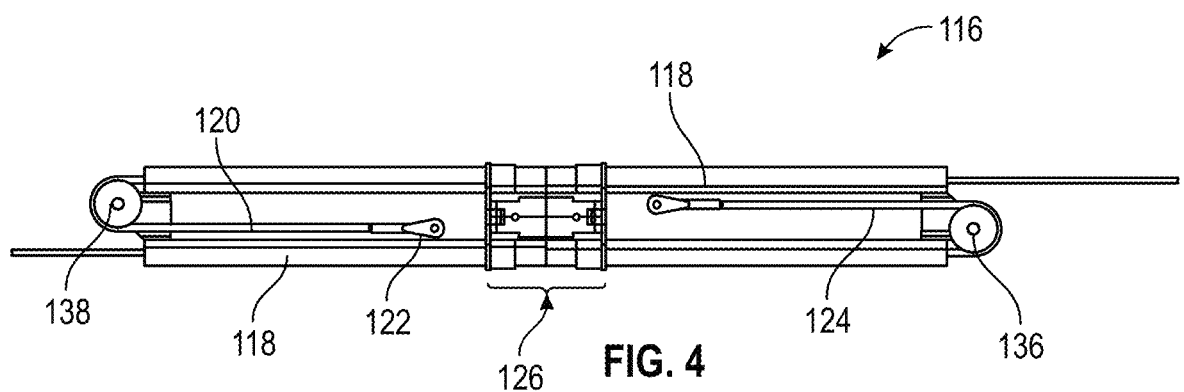
FIG. 4 shows a top view of the illustrative crossbar of FIGS. 2-3, with the outer pieces removed.

The present disclosure is directed to a roof rack system that includes an extendible crossbar, e.g., an extendible crossbar assembly. In some embodiments, the extendible crossbar is capable of being mounted to various mounting locations of a vehicle. For example, an extendible crossbar may be configured to mount at a plurality of pairs of mounting locations, each pair of mounting locations having a different distance between mounting locations. In an illustrative example, a crossbar may be configured to achieve a plurality of lengths to match a distance between a particular pair of mounting locations.

A crossbar is a cargo accessory for vehicles that expands the capability for mounting gear and equipment. Additional attachments can be mounted to the crossbar for specific purposes such as, for example, carrying bicycles, kayaks, skis, snowboards, cargo boxes, and cargo racks. In some circumstances, many such attachments have similar methods of attachment. For example, it may be important that the crossbar retains the same profile along its entire length (e.g., for mounting equipment/attachments at suitable locations along the crossbar) or at particular regions along its entire length.

FIGS. 1A to 1C show an illustrative roof rack system 100, in accordance with some embodiments, of the present disclosure. The roof rack system 100 includes a crossbar 102 configured to mount equipment, with support members 104, e.g., stanchions, at either end of the crossbar 102 configured to mount to a vehicle. FIG. 1A shows a perspective view of the roof rack system 100. FIG. 1B shows a perspective view of one end of the roof rack system 100, while FIG. 1C shows a perspective view of the other end of the roof rack system 100. The stanchions may be coupled to the crossbar in any suitable arrangement (e.g., rigidly coupled, coupled by a swivel joint, coupled by a slide joint, a slip-on interface, a fastened interface, or the stanchions and respective outer pieces may be integrated as a single component). The stanchions include an interface 106 for mounting to the vehicle (e.g., a plug-port interface, a latching mechanism, a fastened interface, any other suitable interface, or any combination thereof).

FIGS. 2-13 show various views of an illustrative crossbar 102 in accordance with some embodiments of the present disclosure.

FIG. 2 shows an illustrative crossbar 102, in accordance with some embodiments of the present disclosure. In some embodiments, the crossbar 102 includes a first section 107, which includes a left hand (LH) outer piece 108, a second section 111, which includes a right hand (RH) outer piece 110, and a third section 109, which includes a center outer piece 112, all created with the same outer profile (e.g., all having similar cross-sections). FIG. 3 shows a cross-sectional view of the crossbar 102 of FIG. 2 (e.g., taken at the "cross-section" callout in FIG. 2). For example, the profile may include a standard T slot 114 (e.g., shown in cross-section in FIG. 3), one or more aerodynamic features (e.g., tapered, sloped, or curved surfaces), mounting features for additional accessories, any other suitable features, or any combination thereof. The crossbar 102 may be able to achieve a minimum length (e.g., as shown in FIG. 2), a maximum length, and any length in between. For example, when the crossbar 102 is contracted completely to its shortest length, the three outer pieces may form one continuous outer profile. In a further example, when the crossbar 102 is expanded to its greatest length, internal expansion features bridge the gap and hold the load between the outer pieces (i.e., the LH outer piece 108 and RH outer piece 110).

Figure 5:
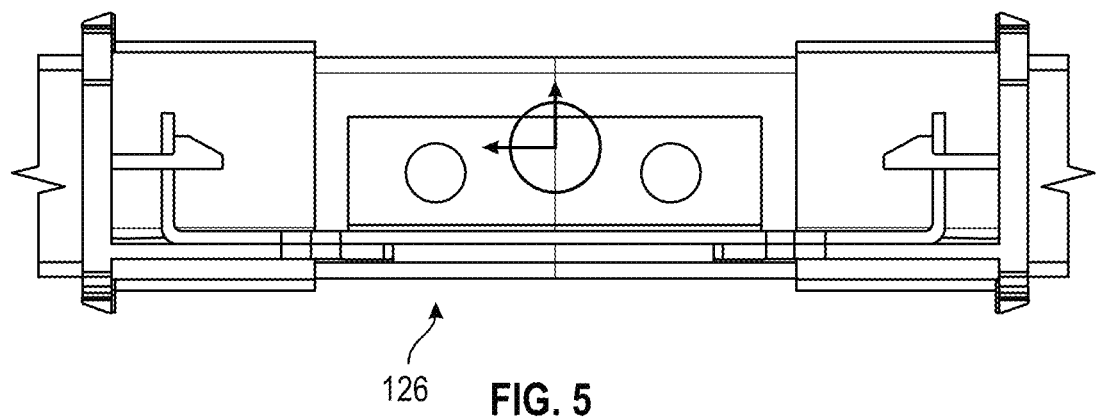
FIG. 5 shows a side view of a center section of the crossbar of FIG. 4, with outer pieces removed.
Figure 6:
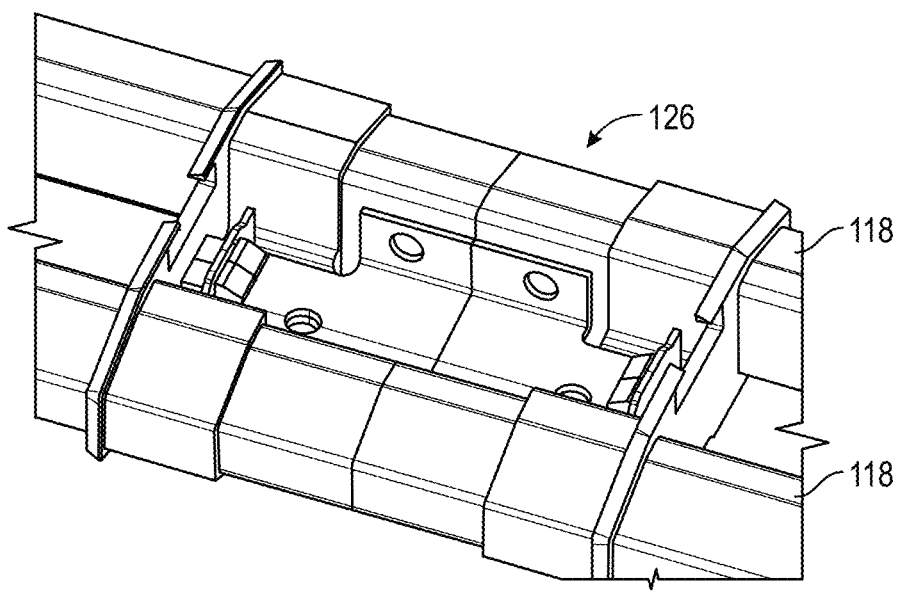
FIG. 6 shows a perspective view of a center section of the crossbar of FIGS. 4-5, with outer pieces removed.
Figure 7:
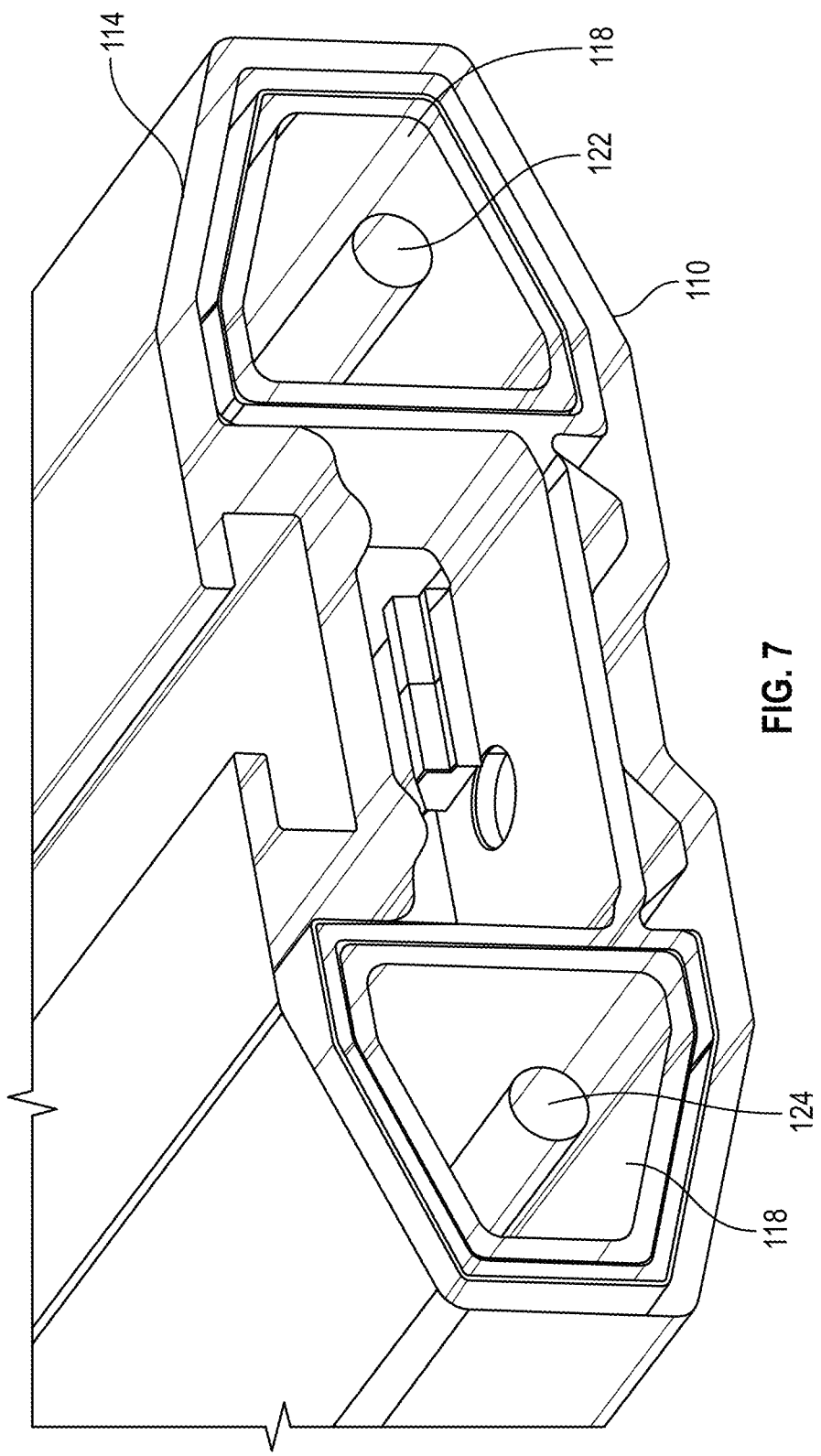
FIG. 7 shows a cross-section view of the crossbar of FIGS. 2-6, with the outer pieces included.

FIG. 4 shows a top view of the illustrative crossbar 102 of FIGS. 2-3, with the outer pieces 108, 110, 112 removed to show an internal structure, e.g., an internal expansion feature 116. The main structure of the internal expansion feature 116 includes one or more internal bars 118 arranged parallel to the outer profile (e.g., along the longitudinal axis of the crossbar 102). The one or more internal bars 118 provide intermediate support when the outer pieces 108, 110 are in any open position (e.g., fully extended or partially extended). In some embodiments, the one or more internal bars 118 are configured so that accessories can mount in the same way they do on the main crossbar sections (e.g., the LH outer piece 108, RH outer piece 110, and center outer piece 112). In some embodiments, the one or more internal bars 118 are rigidly affixed to the center outer piece 112, and thus centered between the LH and RH outer pieces 108, 110. To illustrate, the LH outer piece 108 may slide along the internal bars 118, and the RH outer piece 110 may slide along the internal bars 118. A LH cable 120 is coupled to the LH outer piece 108 such that as the LH outer piece 108 moves outward, the end of the cable 122 coupled to the LH outer piece 108 also moves outward, e.g., by virtue of the other end of the cable 122 being anchored to another component. Similarly, for the RH outer piece 110 and RH cable. The center region shown in FIG. 4 is arranged within the center outer piece 112. FIG. 5 shows a side view of a center section 126 (e.g., including the center region) of the crossbar 102 of FIG. 4, with outer pieces 108, 110, 112 removed. FIG. 6 shows a perspective view of the center section 126 (e.g., including the center region) of the crossbar 102 of FIGS. 4-5, with outer pieces 108, 110, 112 removed. FIG. 7 shows a cross-section view of the crossbar 102 of FIGS. 2-6, with the outer pieces 108, 110, 112 included. In some embodiments, the middle crossbar section (e.g., the center outer piece 112) is self-centering, such that it remains centered about a transverse midplane of the crossbar 102, e.g., centered between the LH and RH outer pieces 108, 110.

Figure 8:
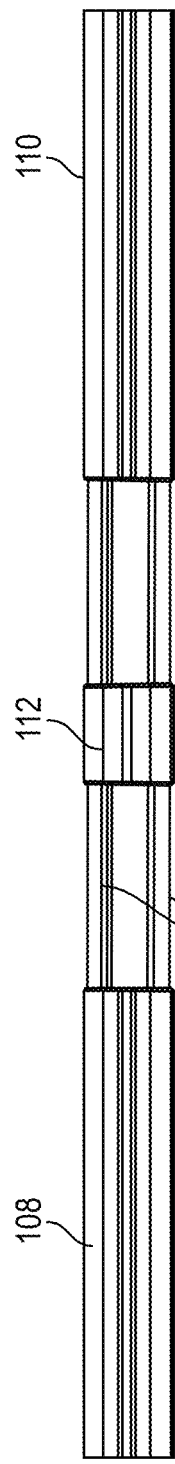
FIG. 8 shows the illustrative cross bar in an expanded state.
Figure 9:
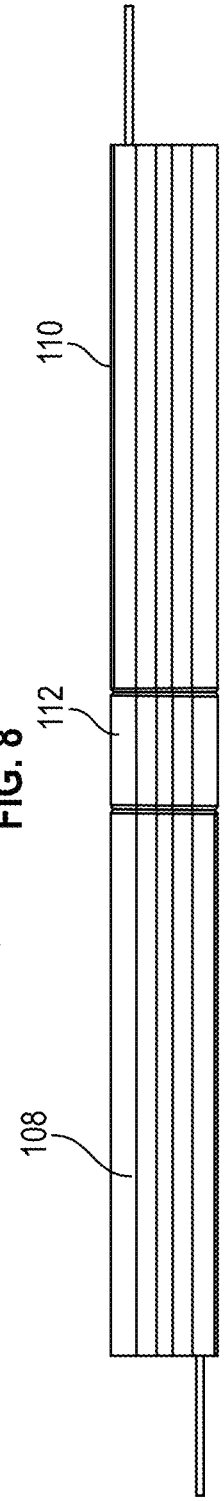
FIG. 9 shows the illustrative cross bar in a contracted state.
Figure 10:
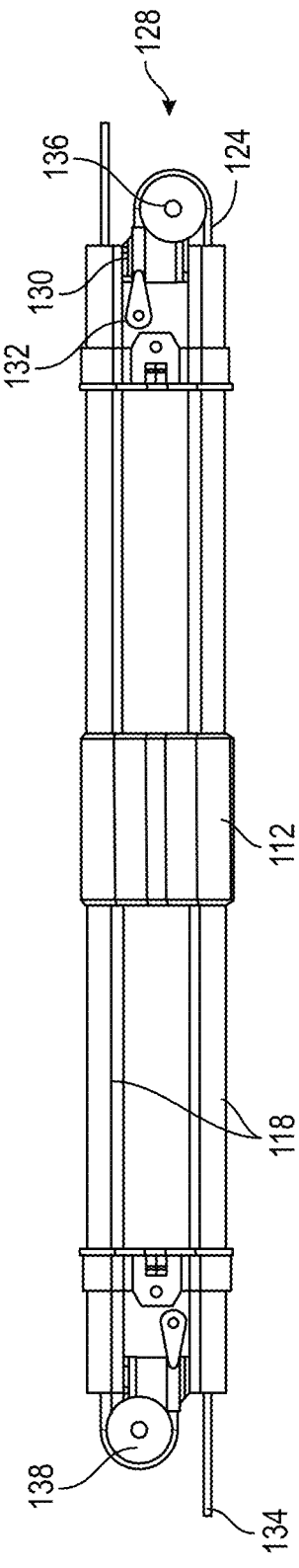
FIG. 10 shows the illustrative cross bar in an expanded state with the outer pieces removed.
Figure 11:
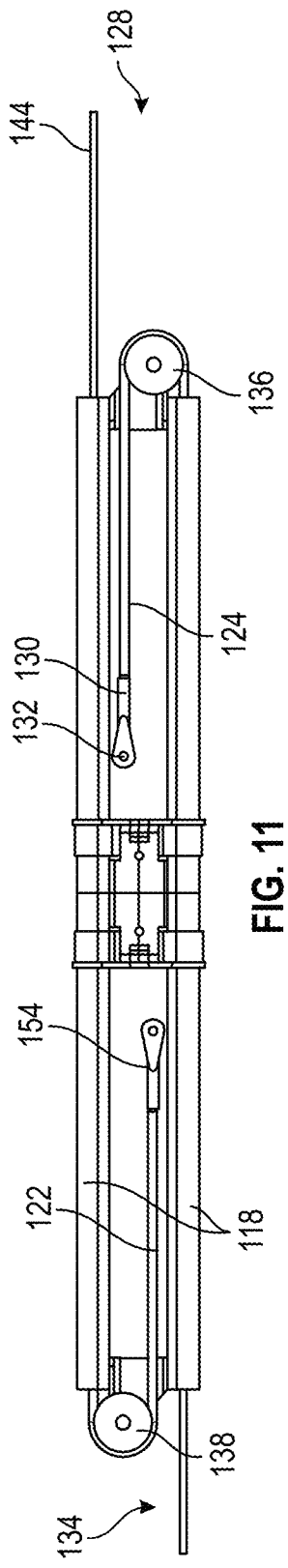
FIG. 11 shows the illustrative cross bar in a contracted state with the outer pieces removed.

In some embodiments, a pulley-cable system 128 connects all three outer pieces 108, 110, 112 together. FIGS. 8-11 illustrate contracted and expanded configurations of the crossbar 102, with and without the outer pieces 108, 110, 112 in place. FIGS. 8 and 10 show the crossbar 102 in an expanded state, while FIGS. 9 and 11 show the crossbar 102 in a contracted state. For example, FIG. 8 shows the crossbar 102 extended with the three outer pieces 108, 110, 112 spaced apart, while FIG. 9 shows the crossbar 102 contracted, with all three outer pieces 108, 110, 112 together. Accordingly, the crossbar 102 may be extended or contracted to achieve a desired length (e.g., for mounting at locations having different span distances). It will be understood that the pulley-cable system 128 is merely illustrative, and any suitable mechanism may be used in accordance with the present disclosure. For example, a rack and pinion mechanism may be used.

Referencing FIGS. 10-11, one end 130 of the RH cable 124 is attached to the RH outer piece 110 (e.g., at the eyelet 132 illustrated) while the other end 134 is attached to the LH crossbar piece (not shown). Between the two cable ends 130, 134, the RH cable 124 rides around the RH pulley 136 that is fixed, e.g., permanently attached to, the center crossbar section (e.g., the center-to-center distance of the RH pulley 136 and LH pulley 138 is fixed). The RH cable 124 direction changes by 180 degrees about the RH pulley 136 such that the section that enters the RH pulley 136 is parallel, but in the opposite pull direction from the section that exits the RH pulley 136. In terms of kinematics, the travel distance of the free end 130 (e.g., the end coupled to and able to move with the RH outer piece 110) of the RH cable 124, relative to the fixed end 134 (e.g., the end coupled to the LH outer piece 108) of the RH cable 124, is twice the displacement of the RH pulley relative to the center section 126, e.g., a transverse midplane of the center section. Regardless of the distance between the inboard ends of the outer pieces 108, 110, the center outer piece 112 remains centered.

As illustrated, the RH and LH cables 122, 124 are not visible to the user because they are routed through the hollow center of the internal bars 118 (e.g., tubes). Out of one respective end of the internal bar 118, each cable 122, 124 runs straight towards the end of one of the end outer pieces. The other end of each cable wraps around the respective pulley mounted to the end of the internal bar. Each cable 122, 124 wraps 180 degrees around the respective pulley 136, 138 and is mounted to the inboard end of the other outer crossbar piece.

In some embodiments, the LH outer piece 108, RH 110 outer piece, and center outer piece 112 and the one or more internal bars 118 are constructed from metal. In some embodiments, the one or more internal bars 118 are isolated from the outer pieces 108, 110, 112 by an intermediate material. For example, the intermediate material may include nylon, rubber, or other suitable material, formed as end caps of the one or more internal bars that prevent vibration, scratching, and wear.

To illustrate, from a fully contracted state, as the RH outer piece 110 moves outboard (i.e., away from the center outer piece 112), the eyelet end 130 of the RH cable 124 also moves outboard, while the other end of the RH cable 124, coupled to the LH outer piece 108, also moves outboard but in the opposite direction. Similar movements take place for the LH cable 122 when the LH outer piece moves outboard. Accordingly, the center outer piece 112 remains centered. For example, a user may apply force, e.g., along the longitudinal axis of the crossbar 102, to any or all of the three outer pieces 108, 110, 112 to contract or expand the length of the crossbar. The pulley system 128 helps ensure the center outer piece 112 remains centered between the RH and LH outer pieces 108, 110.

Figure 12:
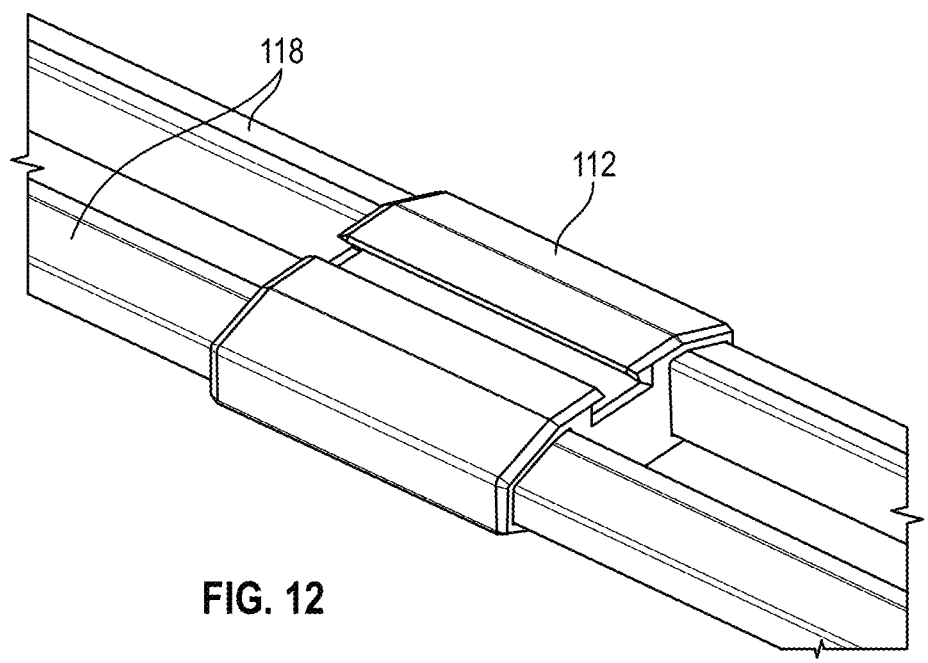
FIG. 12 shows a perspective view a center section of the crossbar, with the center outer piece in place.
Figure 13:
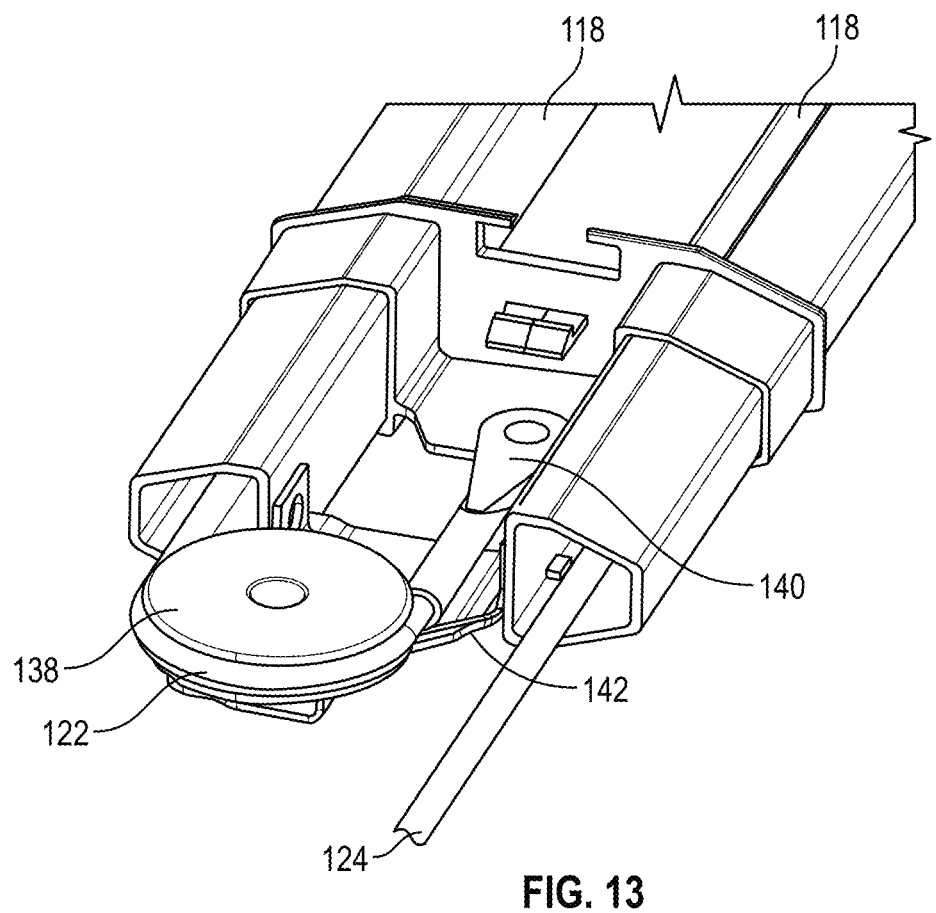
FIG. 13 shows a perspective view of a left-hand pulley, with a left-hand cable, having an eyelet configured to be coupled to an outer piece.

FIG. 12 shows a perspective view a center section of the crossbar, with the center outer piece 112 in place. FIG. 13 shows a perspective view of the LH pulley 138, with the LH cable 122, having an eyelet 140 configured to be coupled to the LH outer piece 108, wrapped around 180 degrees. The RH cable 124 is also visible in FIG. 13. The LH pulley 138, e.g., the LH pulley axle, is rigidly coupled to the internal bars by a bracket 142, as illustrated.

FIGS. 14-15 show block diagrams of an illustrative crossbar 102, in accordance with some embodiments of the present disclosure. FIGS. 14A and 14B show two views, where the view of FIG. 14A omits the LH cable 122 and the view of FIG. 14B omits the RH cable 124, for clarity. FIGS. 14A and 14B show the crossbar 102 in a fully contracted state. FIGS. 15A and 15B show two views of the crossbar 102 extended, where the view of FIG. 15A omits the LH cable 122 and the view of FIG. 15B omits the RH cable 124, for clarity. Each of the RH and LH cables' ends 134, 144 are fixed to the respective outer pieces 108, 110, and accordingly the cable ends 134, 144 move relative to the RH and LH pulleys 136, 138.

In some embodiments, the roof rack system 100 includes one or more locking mechanisms configured to, when locked, constrain motion of a cable, a pully, an outer piece, or a combination thereof, relative to the inner structure (e.g., the internal bars). For example, the locking mechanism may include a clamp on a cable that prevents the cable from moving by applying a friction force. In a further example, the locking mechanism may include a set screw that, when tightened, prevents a pully from rotating. In a further example, the locking mechanism may include a clamp that, when locked, applies a friction force between an internal bar and a LH or RH outer piece to prevent relative motion. In some embodiments, the internal structure may include detent positions, or otherwise provide for discretized extension lengths. For example, the pulley axle may be toothed, or the internal bar may include a ratchet mechanism such that the LH and RH outer pieces achieve predetermined equilibrium positions. In a further example, a cable may include a belt, flexible rod, a wire, a toothed belt, any other suitable flexible component, or combination thereof, that may undergo tension. Accordingly, a pulley may include a grooved pulley, a toothed pulley (e.g., a sprocket or gear), a multi-channel pulley, or a cylindrical pulley, any other suitable rotational member, or any combination thereof. In some embodiments, a pulley may include a rotational element such as a torsion spring, a dampener, a ratchet mechanism, any other suitable rotational element, or any combination thereof. In some embodiments, the roof rack system may include one or more actuators (e.g., an electric motor, a linear actuator such as a solenoid) configured to apply a torque to a pulley, apply a force to an outer piece relative to another outer piece or internal bar, or otherwise apply a force/torque to cause extension or contraction of the crossbar.

In some embodiments, the center outer piece 112 is centered, e.g., longitudinally centered, on the crossbar 112 and is configured to remain centered. For example, some mounting accessories may be required to be attached to a LH or RH outer piece 108, 110 (e.g., a T-slot 114 thereof) and the center section 126 (e.g., a T-slot 114 thereof) of the roof rack system 110. In some embodiments, the LH or RH outer pieces 108, 110 may be relatively longer than the other. In some such embodiments, the RH and LH outer pieces 108, 110 may move by an equivalent amount in respective directions relative to the center outer piece 112, but the center outer piece 112 is not centered along the crossbar 102, e.g., the center outer piece 112 not being centered about the transverse midplane of the crossbar 102. For example, this arrangement may be desired to create a longer section of T-slot 114 in one of the LH or RH outer pieces 108, 110, and a shorter section of T-slot 114 in the other. Further, the roof rack system 100 may be, in some embodiments, reversible in the side-to-side direction so that the long and short pieces may be on either side of the center outer piece 112 (e.g., the roof rack 100, or the cross bar 102, can be flipped left to right). This arrangement may be useful to accommodate a range of accessory widths and shapes. Accessories may include for example, kayaks, storage containers, surfboards, canoes, skis, snowboards, bikes or bike racks, cargo bed covers, any other suitable equipment, or any combination thereof.

Figure 16A:
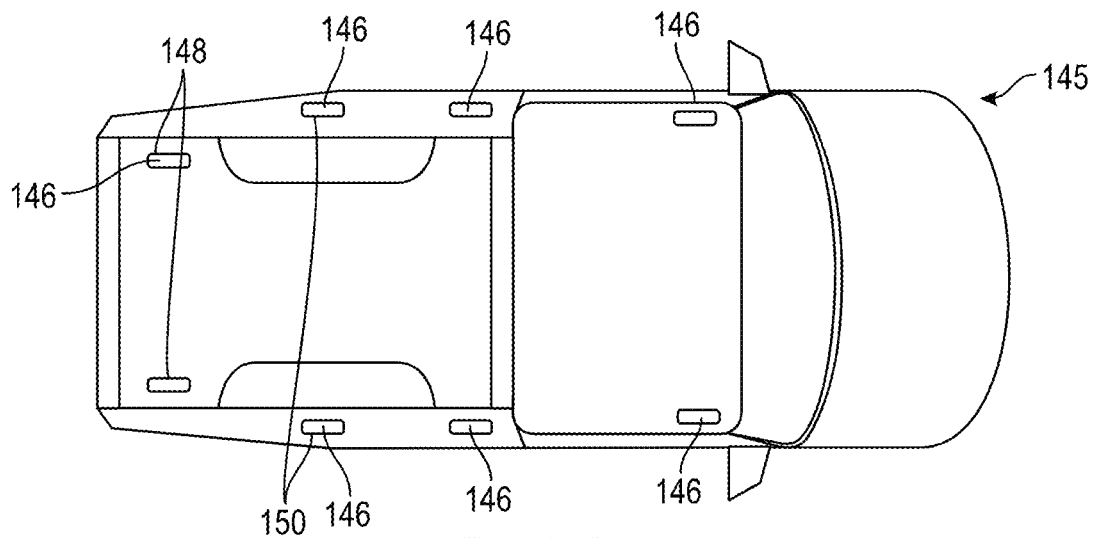
FIGS. 16A to 16C show three top views of a vehicle having mounting locations, with and without a roof rack installed, in accordance with some embodiments of the present disclosure.
Figure 16B:
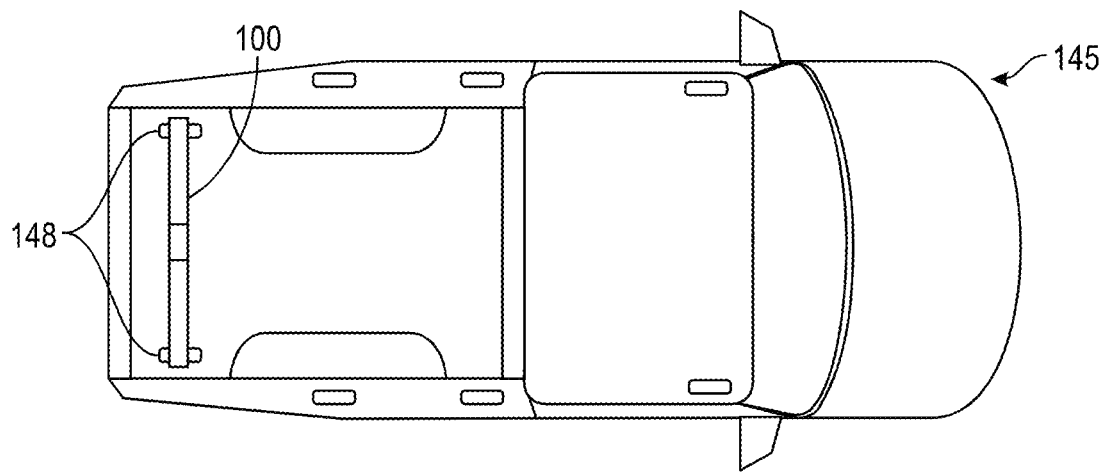
Figure 16C:
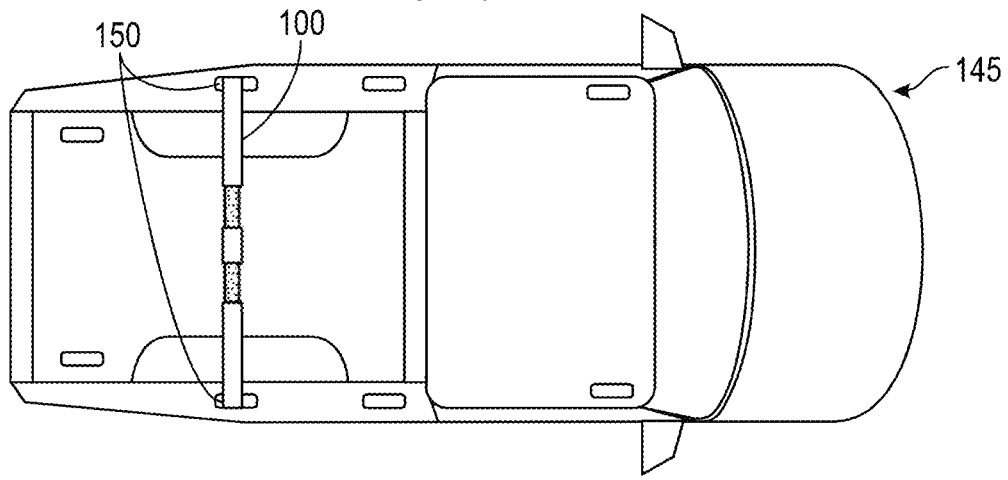

FIGS. 16A to 16C show three top views of a vehicle 145 having mounting locations 146, with and without a roof rack installed, in accordance with some embodiments of the present disclosure. FIG. 16A shows the vehicle 145 without a roof rack installed, as well as pairs of mounting locations 146 (e.g., mounting location pair 148 and mounting location pair 150). FIG. 16B shows the vehicle with the roof rack 100 installed at mounting location pair 148 (e.g., in the cargo bed), in a fully contracted state. The span distance (i.e., the distance between the two mounting locations of the pair) of mounting location pair 148 is less than the span distance of mounting location pair 150. FIG. 16C shows the vehicle 145 with the roof rack 100 installed at mounting location pair 150 (e.g., on top of the cargo bed), in an extended state. Accordingly, the roof rack 100 provides a system to mount cargo on a vehicle at different locations. Further, a user may use the same crossbar 102 for multiple mounting arrangements. Still further, the roof rack 100 may be stored in its smallest configuration (e.g., fully contracted), thus minimizing the required packaging space.

FIGS. 17-33 show various views and states of an illustrative roof rack 100, in accordance with some embodiments of the present disclosure.

Figure 17:
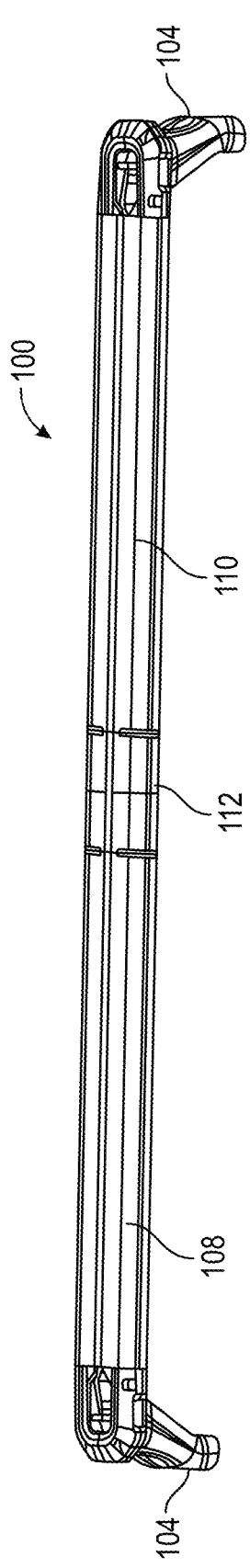
FIG. 17 shows a top perspective view of an illustrative roof rack in a contracted state, in accordance with some embodiments of the present disclosure.

FIG. 17 shows a top perspective view of the illustrative roof rack 100 in a contracted state, in accordance with some embodiments of the present disclosure.

Figure 18:
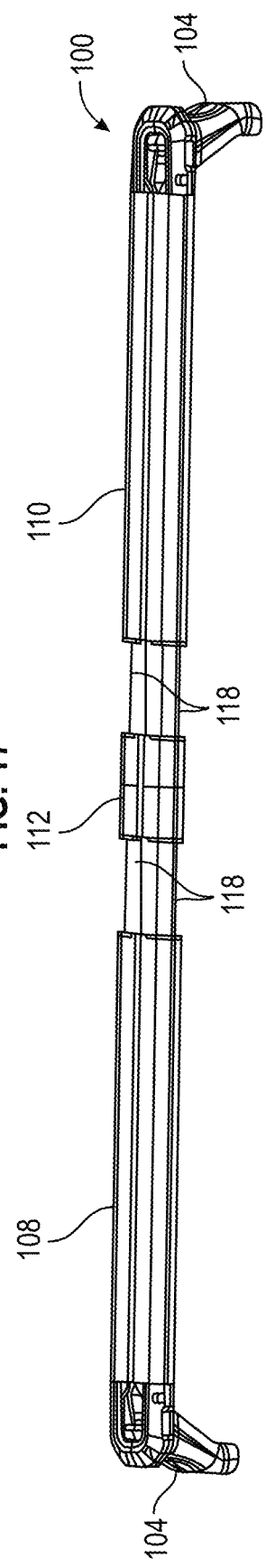
FIG. 18 shows a top perspective view of an illustrative roof rack in a partially extended state, in accordance with some embodiments of the present disclosure.

FIG. 18 shows a top perspective view of the illustrative roof rack 100 in a partially extended state, in accordance with some embodiments of the present disclosure.

Figure 19:
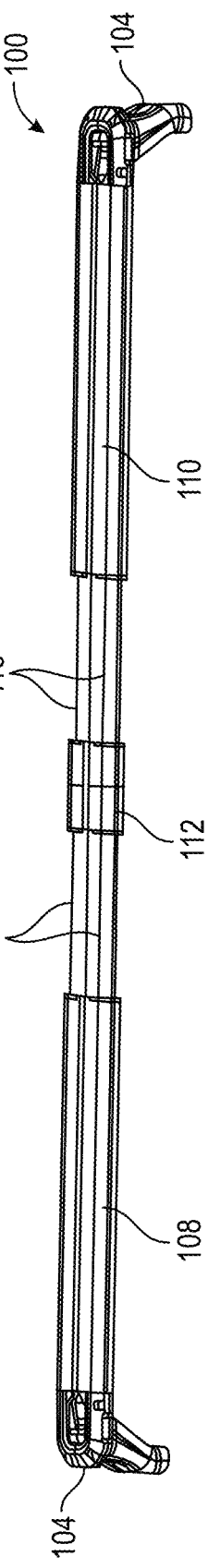
FIG. 19 shows a top perspective view of an illustrative roof rack in a fully extended state, in accordance with some embodiments of the present disclosure.

FIG. 19 shows a top perspective view of the illustrative roof rack 100 in a fully extended state, in accordance with some embodiments of the present disclosure.

Figure 20:
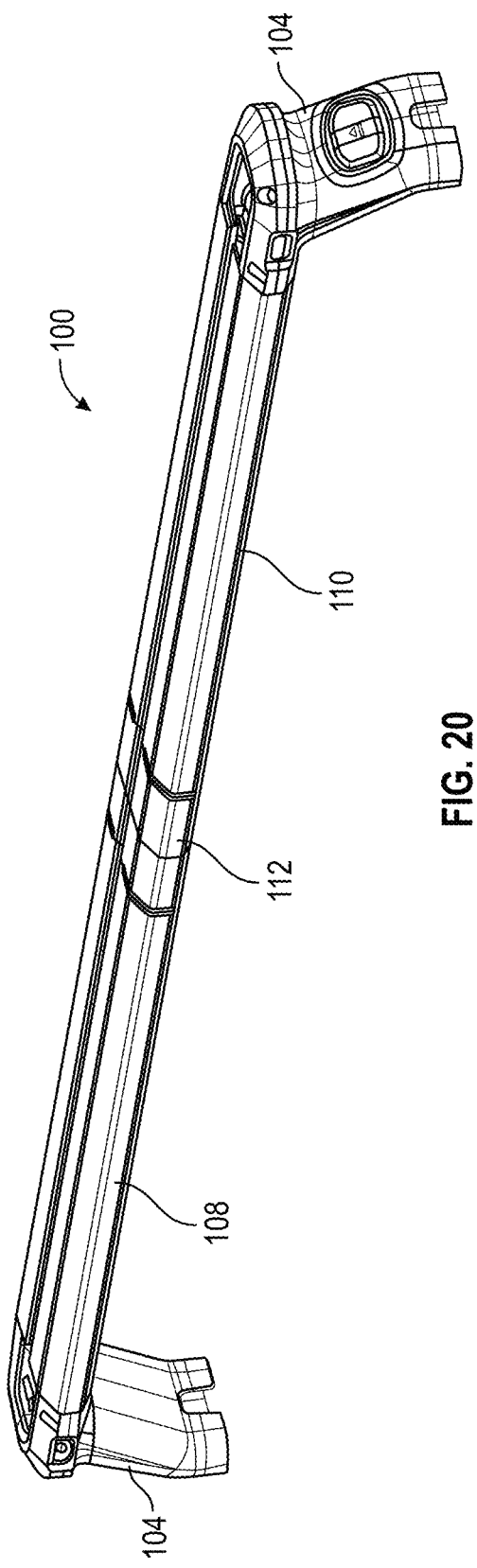
FIG. 20 shows a perspective view of an illustrative roof rack in a contracted state, in accordance with some embodiments of the present disclosure.

FIG. 20 shows a perspective view of the illustrative roof rack 100 in a contracted state, in accordance with some embodiments of the present disclosure.

Figure 21:
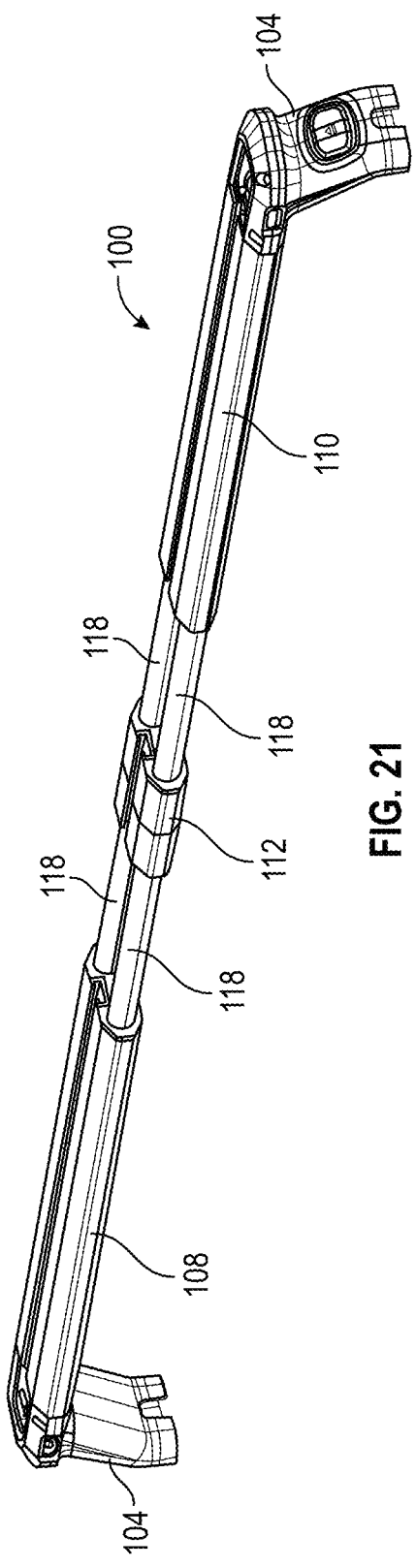
FIG. 21 shows a perspective view of an illustrative roof rack in a fully extended state, in accordance with some embodiments of the present disclosure.

FIG. 21 shows a perspective view of the illustrative roof rack 100 in a fully extended state, in accordance with some embodiments of the present disclosure.

Figure 22:
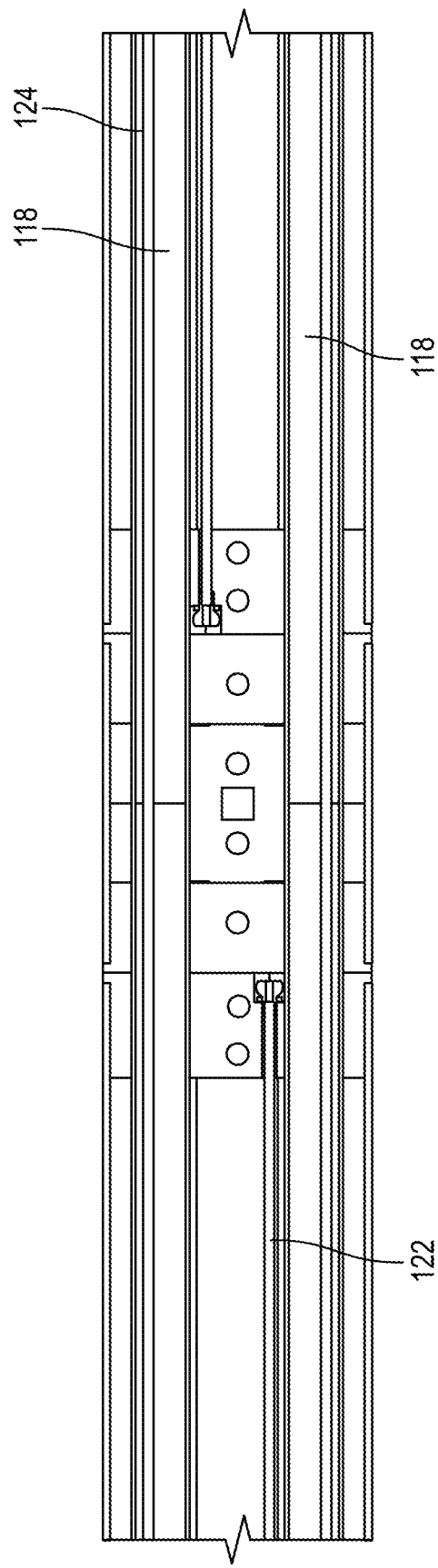
FIG. 22 shows a top cross-sectional view of an illustrative roof rack in a contracted state, in accordance with some embodiments of the present disclosure.

FIG. 22 shows a top cross-sectional view of the illustrative roof rack 100 in a contracted state, in accordance with some embodiments of the present disclosure. The internal bars 118, LH cable 122 and RH 124 cable are shown in FIG. 22.

Figure 23:
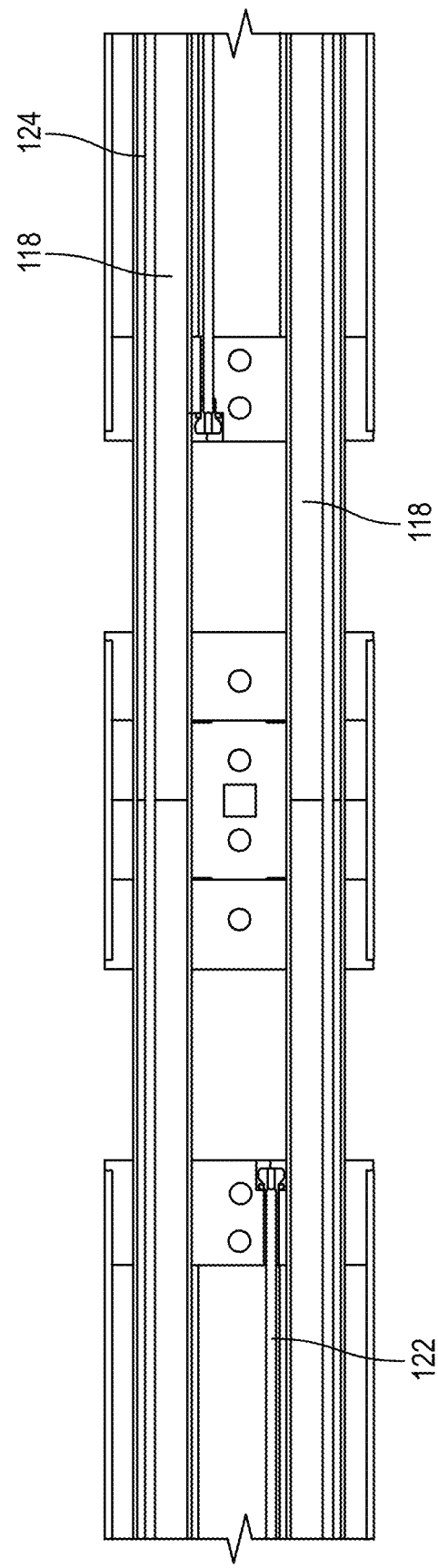
FIG. 23 shows a top cross-sectional view of an illustrative roof rack in a partially extended state, in accordance with some embodiments of the present disclosure.

FIG. 23 shows a top cross-sectional view of the illustrative roof rack 100 in a partially extended state, in accordance with some embodiments of the present disclosure. The internal bars 118, LH cable 122 and RH cable 124 are shown in FIG. 23.

Figure 24A:
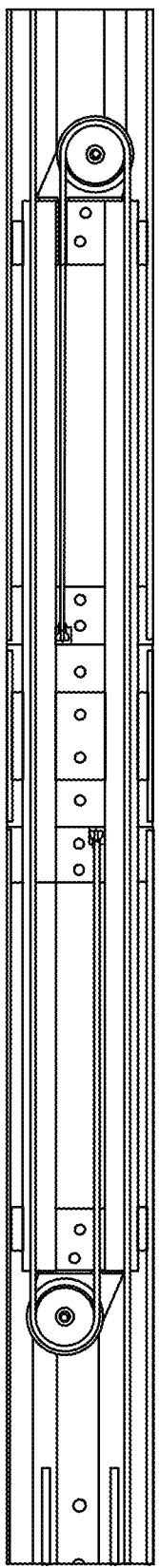
FIGS. 24A to 24D show four top cross-sectional views of an illustrative roof rack in four respective states, with all four views centered at the center of the roof rack, in accordance with some embodiments of the present disclosure.
Figure 24B:
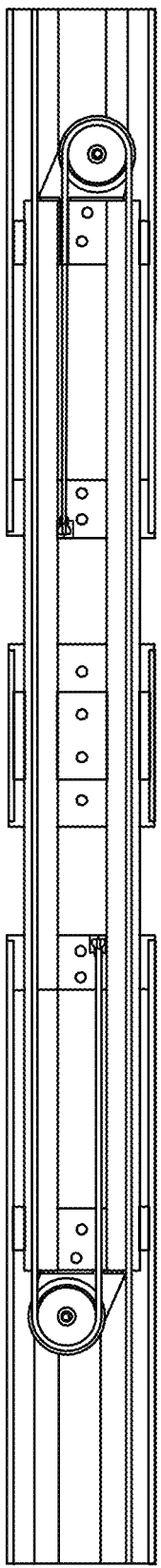
Figure 24C:
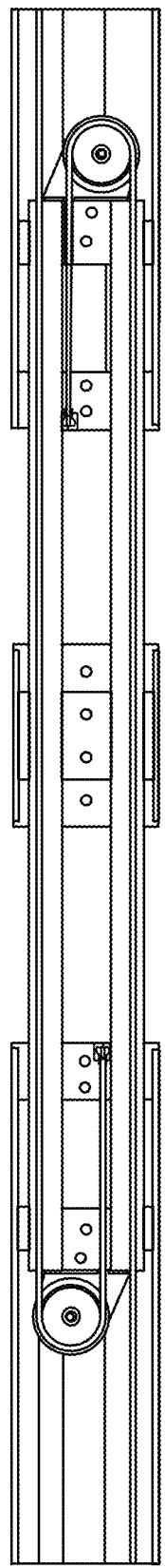
Figure 24D:
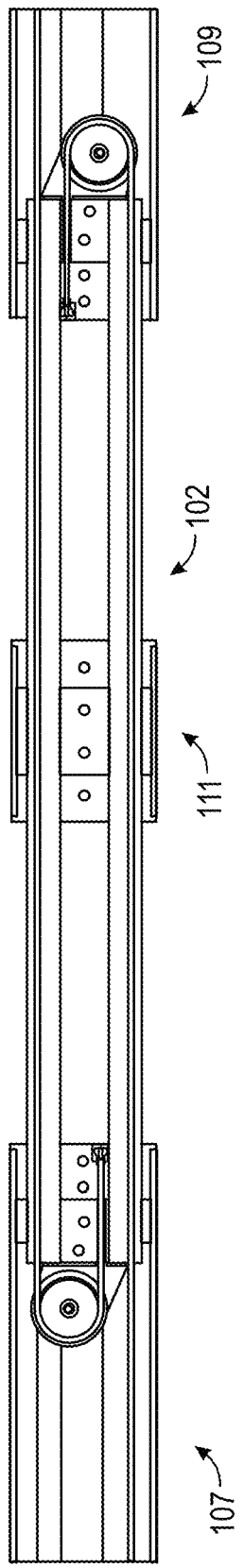

FIGS. 24A to 24D show four top cross-sectional views of the illustrative roof rack 100 in four respective states, with all four views centered at the center of the roof rack 100, e.g., centered about the transvers midplane of the crossbar assembly 102, in accordance with some embodiments of the present disclosure. FIG. 24A shows the roof rack 100 in a contracted state. FIG. 24B shows the roof rack 100 in a first partially extended state. FIG. 24C shows the roof rack 100 in a second partially extended state. FIG. 24D shows the roof rack 100 in a fully extended state. FIGS. 24A to 24D illustrate how each of the first and second sections 107, 109 translate along the longitudinal axis of the crossbar assembly 102 whilst remaining centered about a transverse plane of the crossbar assembly 102, which in this case is the transverse midplane, to which the third section is fixed.

Figure 25A:
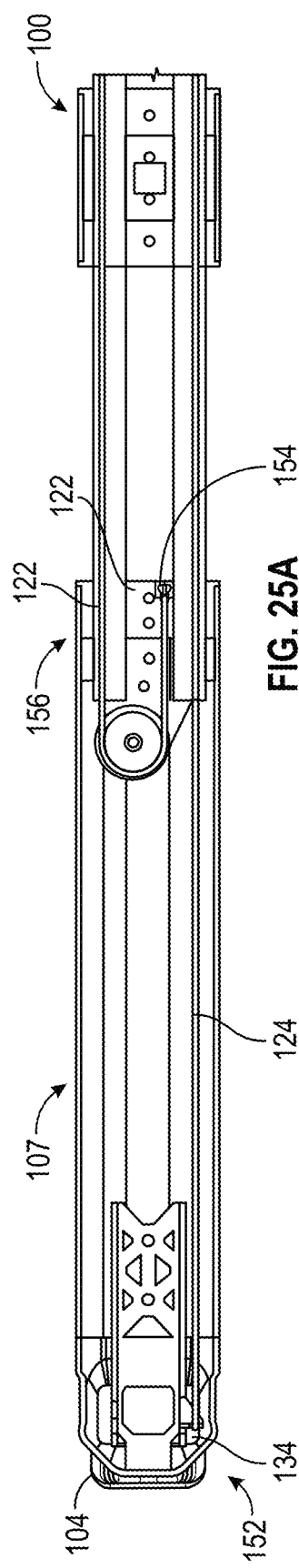
FIGS. 25A to 25D show four top cross-sectional views of an illustrative roof rack in four respective states, with all four views directed to the left-hand side of the roof rack, in accordance with some embodiments of the present disclosure.
Figure 25B:
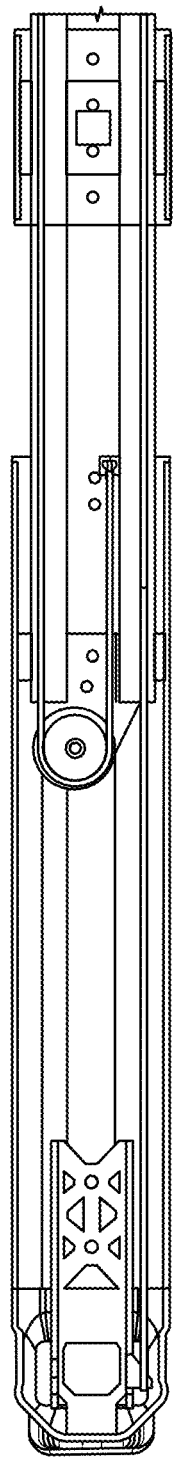
Figure 25C:
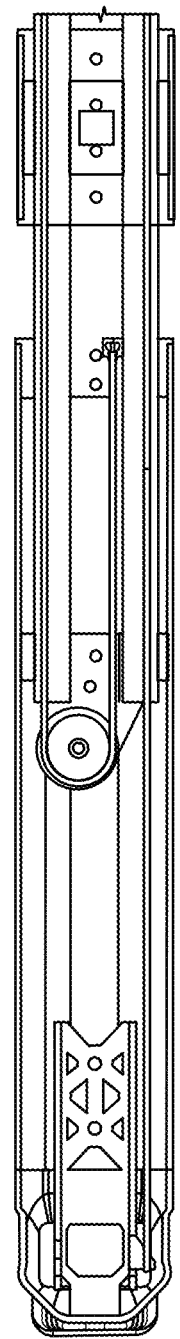
Figure 25D:
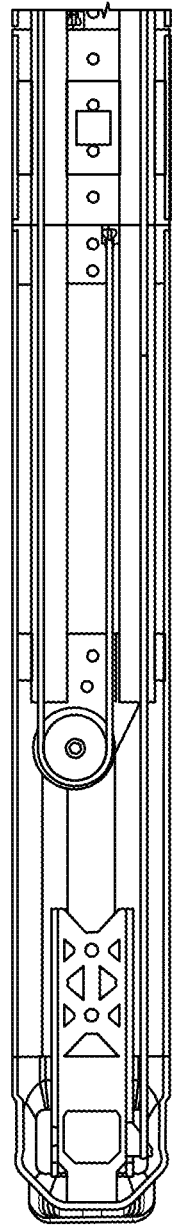

FIGS. 25A to 25D show four top cross-sectional views of the illustrative roof rack 100 in four respective states, with all four views directed to the LH side of the roof rack 100, in accordance with some embodiments of the present disclosure. FIG. 25A shows the roof rack 100 in a fully extended state. FIG. 25B shows the roof rack 100 in a first partially contracted state. FIG. 25C shows the roof rack 100 in a second partially contracted state. FIG. 25D shows the roof rack 100 in a fully contracted state. FIGS. 25A to 25D illustrate how the end 134 of the RH cable 124 is fixed, e.g., directly or indirectly, to the outboard end 152 of the first section 107, e.g., at a point on the LH stanchion 104, and how the end 154 of the LH cable 122 is fixed, e.g., directly or indirectly, to the inboard end 156 of the first section 107, e.g., at a point on end plate 158.

Figure 26:
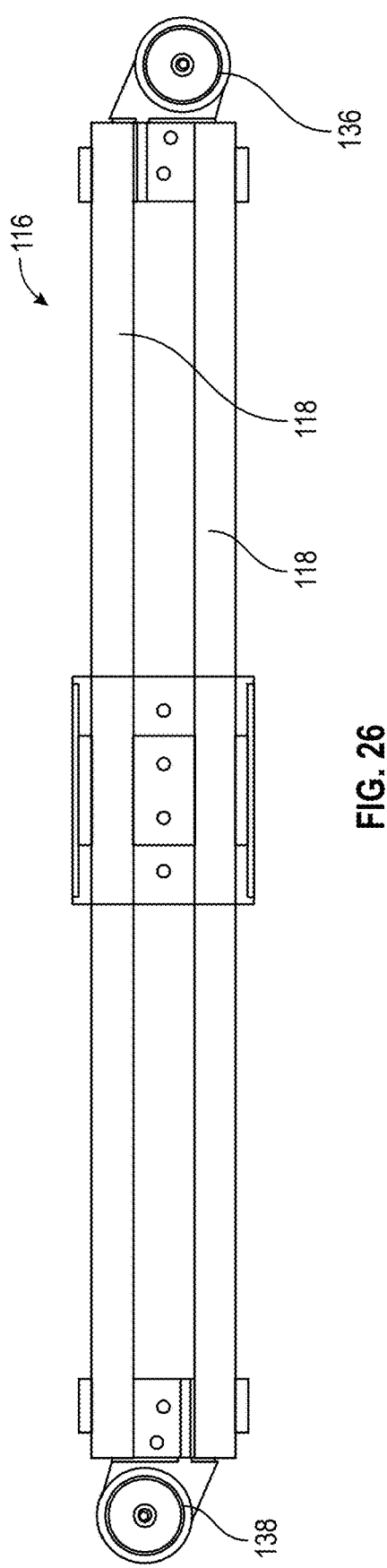
FIG. 26 shows a top view of an illustrative internal structure of the illustrative roof rack, including a left-hand pulley and a right-hand pulley with the roof rack in a contracted state, in accordance with some embodiments of the present disclosure.

FIG. 26 shows a top view of the illustrative internal structure of the illustrative roof rack 100, including the LH and RH pulleys 136, 138, in accordance with some embodiments of the present disclosure.

Figure 27:
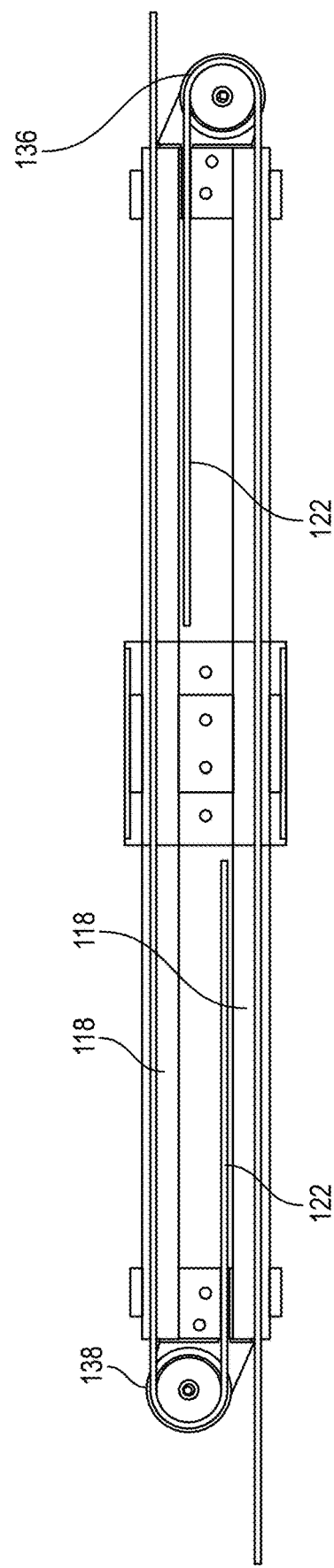
FIG. 27 shows a top cross-sectional view of an illustrative internal structure of the roof rack, including a left-hand pulley, a right-hand pulley, a left-hand cable and a right-hand cable with the roof rack in a contracted state, in accordance with some embodiments of the present disclosure.

FIG. 27 shows a top cross-sectional view of the illustrative internal structure of the roof rack 100, showing the LH and RH cables 122, 124 with the roof rack 100 in a contracted state, in accordance with some embodiments of the present disclosure.

Figure 28:
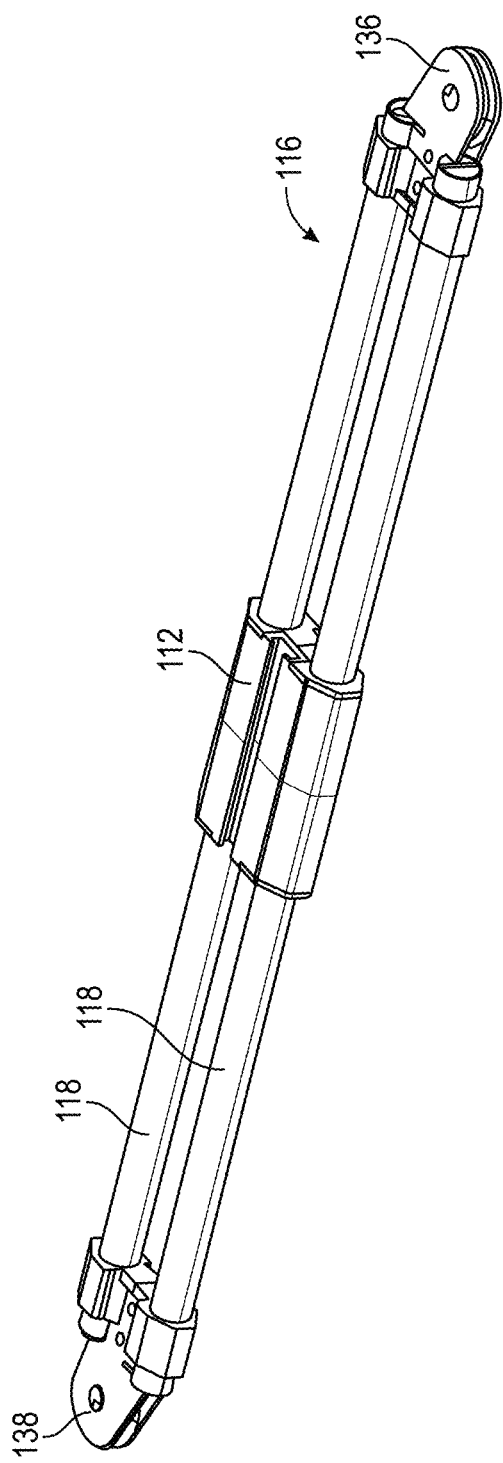
FIG. 28 shows a perspective view of an illustrative internal structure of the roof rack, including a left-hand pulley and a right-hand pulley with the roof rack in a contracted state, in accordance with some embodiments of the present disclosure.

FIG. 28 shows a perspective view of the illustrative internal structure of the roof rack 100, in accordance with some embodiments of the present disclosure.

Figure 29:
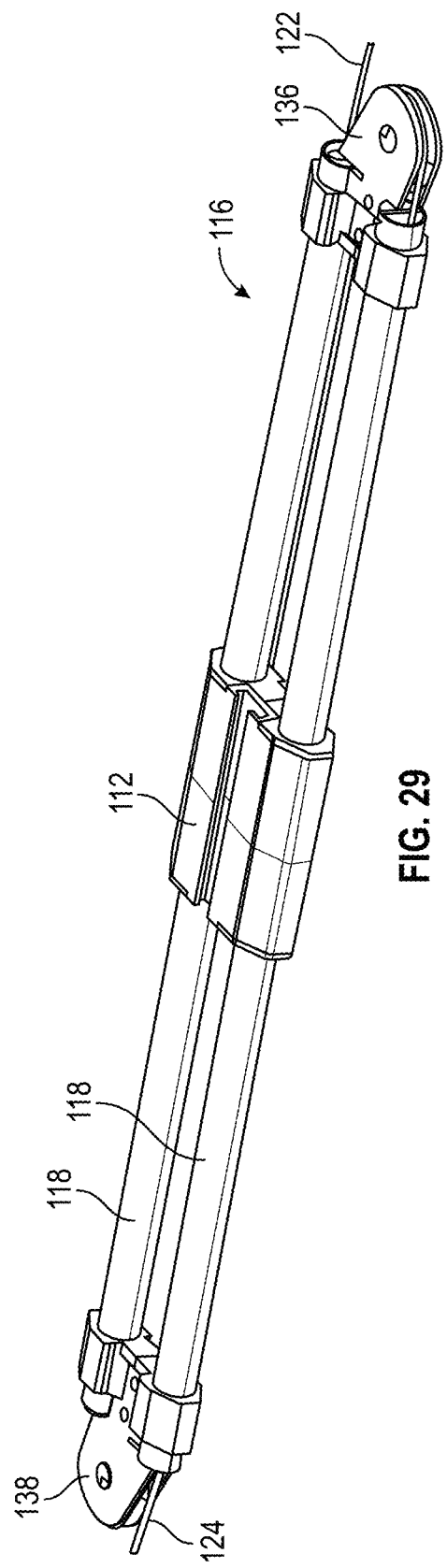
FIG. 29 shows a perspective view of the illustrative internal structure of the roof rack, including a left-hand pulley, a right-hand pulley, a left-hand cable and a right-hand cable with the roof rack in a contracted state, in accordance with some embodiments of the present disclosure.

FIG. 29 shows a perspective view of the illustrative internal structure of the roof rack 100, with the LH and RH cables 122, 124, in accordance with some embodiments of the present disclosure.

FIG. 30 shows a perspective cross-sectional view of the illustrative LH outer piece 108 and corresponding stanchion 104, in accordance with some embodiments of the present disclosure. FIG. 30 also shows a bracket 160 configured to provide stiffness between the LH outer piece 108 and the stanchion 104. The end of the RH cable may be fixed to the bracket 160.

FIG. 31 shows a perspective view of the illustrative LH outer piece 108 and corresponding stanchion 104, in accordance with some embodiments of the present disclosure. FIG. 31 also shows a tie down 161 configured to provide a feature to affix a cable or other securement for securing equipment to the roof rack 100. The bracket 160 prevents relative motion between the stanchion 104 and the LH outer piece 108. Although not shown, a similar arrangement may be included for the RH outer piece 110 and corresponding stanchion 104.

Figure 32:
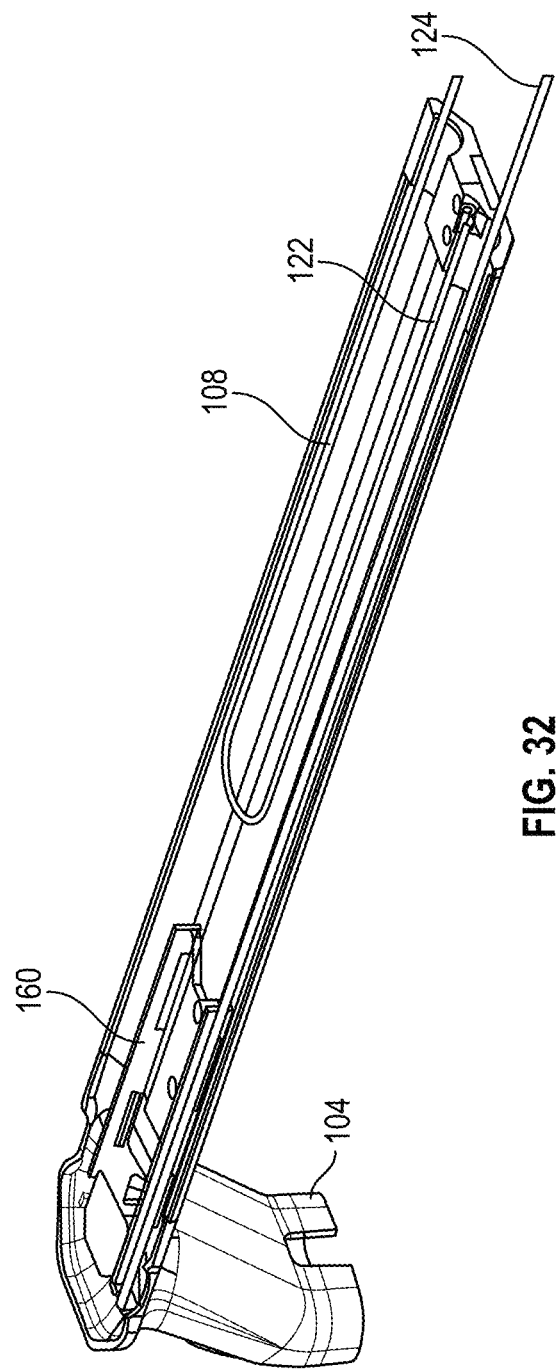
FIG. 32 shows a perspective cross-sectional view of an illustrative left-hand outer piece and corresponding stanchion, including a left-hand cable and a right-hand cable with the roof rack in a contracted state, in accordance with some embodiments of the present disclosure.

FIG. 32 shows a perspective cross-sectional view of the illustrative LH outer piece 108 and corresponding stanchion 104, including the LH cable 122 and RH cable 124 in a contracted state, in accordance with some embodiments of the present disclosure. The RH cable 124 is affixed to the bracket 160. For example, the substantially vertical portions of the bracket 160 prevent rotation of the stanchion 104 relative to the crossbar 102 about an axis perpendicular to the plane of the vertical portions. In a further example, the substantially horizontal portion of the bracket 160 maintains the vertical sections in position and together prevents rotation about a vertical axis.

Figure 33:
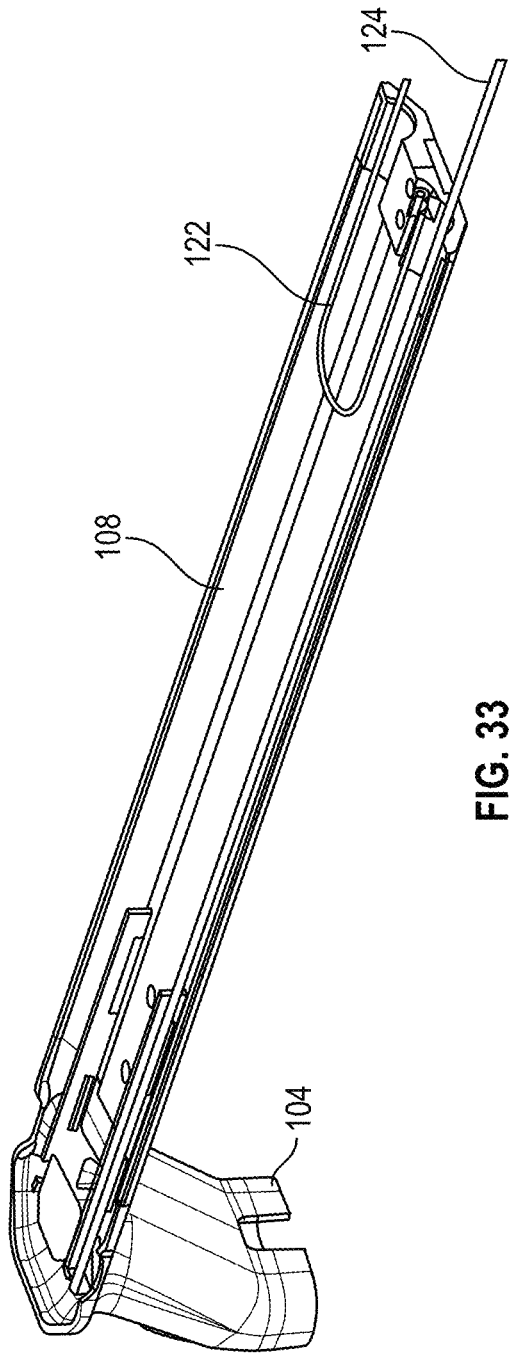
FIG. 33 shows a perspective cross-sectional view of an illustrative left-hand outer piece and corresponding stanchion, including a left-hand cable and a right-hand cable with the roof rack in an expanded state, in accordance with some embodiments of the present disclosure.

FIG. 33 shows a perspective cross-sectional view of the illustrative LH outer piece 108 and corresponding stanchion 104, including the LH cable 122 and RH cable 124 in an extended state, in accordance with some embodiments of the present disclosure.

Figure 34:
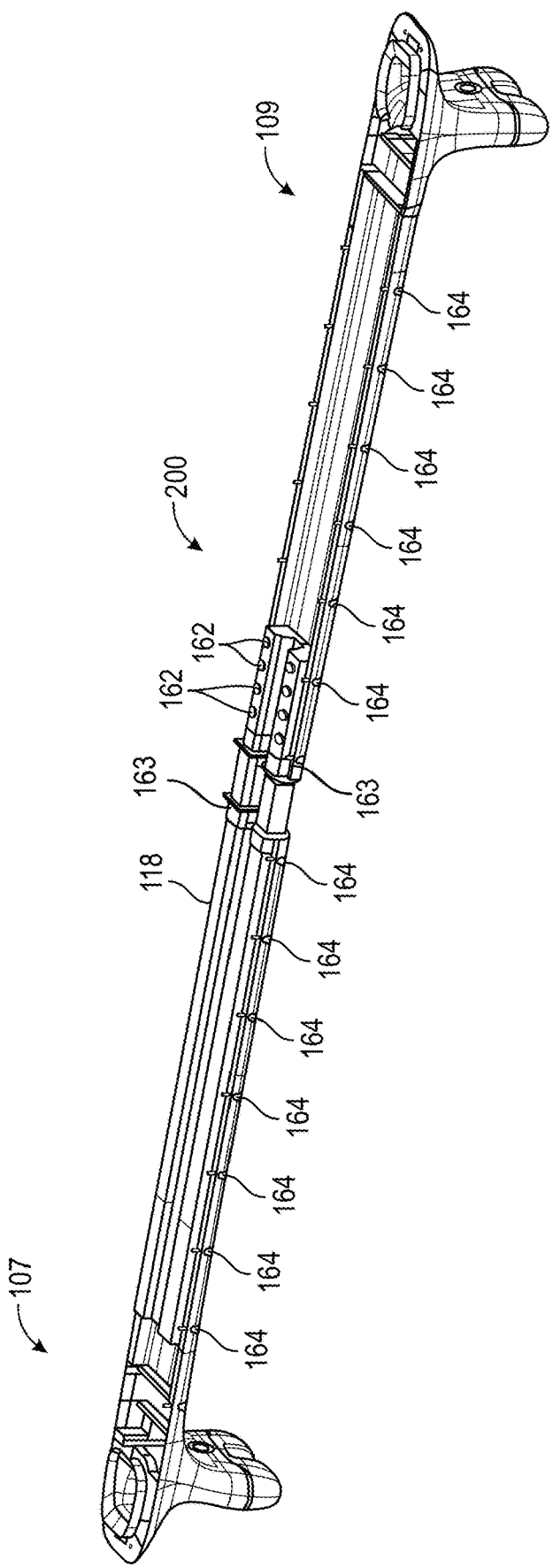
FIG. 34 shows a perspective cross-sectional view of an illustrative roof rack with the roof rack in a partially expanded state, in accordance with some embodiments of the present disclosure.

FIG. 34 shows a perspective cross-sectional view of an illustrative roof rack 200. Similar to roof rack 100, roof rack 200 comprises a first section 107 and a second section 109, which are configured to receive the internal bars 118. However, roof rack 200 does not include a pulley cable mechanism. The internal bars 118 of roof rack 200 are free to slide through at least one of the first section 107 and the second section 109. In some embodiments, the roof rack 200 may comprise at least one bushing 163, e.g., a sleeve bearing, configured to constrain off-axis movement of the internal bars 118, e.g., movement of the internal bars 118 in a direction perpendicular to the axis of motion, whilst allowing the internal bars 118 to slide freely along the axis of motion. In some embodiments, the bushing 163 may be configured to constrain the rotational motion of the internal bars 118, e.g., the rotation of the internal bars 118 around the axis of motion. It will be understood that roof rack 100, similar to roof rack 200, may comprise at least one bushing similar to bushing 163.

In some embodiments, the internal bars 118 may be fixed relative to each of the first section 107 and the second section 109 by virtue of detent features 162 in the internal bars 118 configured to interact with detent feature 164 on each of the first section 107 and the second section 109. For example, the detent features 162 in the internal bars 118 and the detent feature 164 on each of the first section 107 and the second section 109 may comprise a series of openings configured to receive a locking pin. In this way, the length of the crossbar assembly 102 may be adjusted by aligning the desired detent features 162 in the internal bars 118 and the detent feature 164 on each of the first section 107 and the second section 109. The detent features 162 in the internal bars 118 may have a different spacing to the detent feature 164 on each of the first section 107 and the second section 109. For example, the spacing of the detent features 162 on in the internal bars 118 may be closer or further apart than the spacing of the detent feature 164 on each of the first section 107 and the second section 109. In some embodiments, the internal bars 118 are rigidly connected to the first section 107 or the second section 109 and are slidably connected to the other section. In some embodiments, roof rack 100 may comprise detent features 162, 164 similar to those shown on roof rack 200. In some embodiments, the roof rack 100 and the roof rack 200 may be provided without the detent features 162, 164.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A crossbar assembly configured for mounting equipment to a vehicle, the crossbar assembly comprising:
   a first end mount arranged at a first end of the crossbar assembly;
   a second end mount arranged at a second end of the crossbar assembly; and
   a crossbar extending between the first end mount and the second end mount along an axis, wherein:
   the crossbar assembly is configured to achieve a plurality of extension lengths along an internal structure of the crossbar assembly;
   the crossbar assembly comprises at least one bushing configured to constrain off-axis movement of the internal structure;
   a first section of the crossbar is moveably coupled to an end of the internal structure, wherein the first section comprises a plurality of detent position features that interface with the internal structure;
   the first section is coupled to the first end mount; and
   a second section of the crossbar is coupled to the second end mount.

2. The crossbar assembly of claim 1, wherein:
   the internal structure comprises at least one internal bar configured to provide structure rigidity to the crossbar assembly; and
   one of the first section or the second section is configured to translate relative to the at least one internal bar.

3. The crossbar assembly of claim 1, wherein:
   the internal structure comprises at least one internal bar configured to provide structure rigidity to the crossbar assembly; and
   the crossbar assembly further comprises at least one slide mechanism configured to allow the first section and the second section to translate relative to the at least one internal bar.

4. The crossbar assembly of claim 1, wherein:
   the plurality of detent position features is a first plurality of detent position features;
   the second section comprises a second plurality of detent position features that interface with the internal structure; and
   the first section and the second section are configured to move towards and away from each other via the first plurality of detent position features and the second plurality of detent position features to change a distance between the first end mount and the second end mount.

5. The crossbar assembly of claim 1, the internal structure further comprising a locking mechanism configured to constrain motion of the first section or the second section relative to the internal structure.

6. The crossbar assembly of claim 1, wherein:
   the plurality of detent position features is a first plurality of detent position features;
   the second section comprises a second plurality of detent position features that interface with the internal structure; and
   spacing of the first plurality of detent position features is different from spacing of the second plurality of detent position features.

7. The crossbar assembly of claim 1, wherein the first end mount and the first section are integrated as a single component, and wherein the second end mount and the second section are integrated as a single component.

8. A crossbar assembly configured for mounting equipment to a vehicle, the crossbar assembly comprising:
   a first end mount arranged at a first end of the crossbar assembly;
   a second end mount arranged at a second end of the crossbar assembly;
   a first section coupled to the first end mount, wherein the first section comprises a plurality of detent position features that interface with an internal structure of the crossbar assembly;
   a second section coupled to the second end mount; and
   a bushing configured to constrain off-axis movement of the internal structure, wherein:
   the internal structure comprises at least one internal bar, and
   the crossbar assembly is configured to achieve a plurality of extension lengths along the internal structure.

9. The crossbar assembly of claim 8, wherein the second section comprises the at least one internal bar, wherein the at least one internal bar is configured to slide along the bushing relative to the first section, and wherein the at least one internal bar is configured to slide through the first section.

10. The crossbar assembly of claim 9, wherein:
    the plurality of detent position features is a first plurality of detent position features;
    the second section comprises a second plurality of detent position features that interface with the internal structure; and
    the first section and the second section are configured to move towards and away from each other via the first plurality of detent position features and the second plurality of detent position features to change a distance between the first end mount and the second end mount.

11. The crossbar assembly of claim 8, wherein:
    the crossbar assembly is configured to mount to a first pair of mounting locations of a plurality of mounting locations having a first span distance;
    the crossbar assembly is configured to mount to a second pair of mounting locations of the plurality of mounting locations having a second span distance; and
    the second span distance is greater than the first span distance.

12. The crossbar assembly of claim 8, further comprising a locking mechanism configured to constrain movement of the first section relative to the second section.

13. A vehicle comprising:
    a plurality of mounting locations; and
    a crossbar assembly for configured for mounting equipment to the vehicle, the crossbar assembly comprising:
    a first end mount arranged at a first end of the crossbar assembly and configured to mount to a first mounting location of the plurality of mounting locations;
    a second end mount arranged at a second end of the crossbar assembly and configured to mount to a second mounting location of the plurality of mounting locations, wherein the first mounting location and the second mounting location are a first pair of mounting locations having a first span distance;
    a first section coupled to the first end mount, wherein:
    the first section comprises a plurality of detent position features that interface with an internal structure of the crossbar assembly, and
    the crossbar assembly is configured to achieve a plurality of extension lengths along the internal structure of the crossbar assembly;

a second section coupled to the second end mount; and
a bushing configured to constrain off-axis movement of the internal structure.

14. The vehicle of claim 13, wherein:
the plurality of detent position features is a first plurality of detent position features;
the second section comprises a second plurality of detent position features that interface with the internal structure; and
the first section and the second section are configured to move towards and away from each other via the first plurality of detent position features and the plurality of detent position features to change a distance between the first end mount and the second end mount.

15. The crossbar assembly of claim 1, wherein the first end mount comprises a latching mechanism for mounting to the vehicle.

16. The crossbar assembly of claim 1, wherein the first end mount comprises a rounded portion configured to mount to a first mounting location.

17. The vehicle of claim 13, wherein the first end mount comprises a latching mechanism for mounting to the first mounting location.

18. The vehicle of claim 13, wherein the first end mount comprises a rounded portion configured to mount to the first mounting location.

19. The crossbar assembly of claim 1, wherein the first end mount and a first mounting location form a plug-port interface, and wherein the second end mount and the second mounting location form another plug-port interface.

* * * * *